(12) United States Patent
Gebeau

(10) Patent No.: US 8,904,987 B2
(45) Date of Patent: Dec. 9, 2014

(54) SUPERCHARGED ENGINE DESIGN

(71) Applicant: Gary G. Gebeau, Chalfont, PA (US)

(72) Inventor: Gary G. Gebeau, Chalfont, PA (US)

(*) Notice: Subject to any disclaimer, the term of this patent is extended or adjusted under 35 U.S.C. 154(b) by 0 days.

(21) Appl. No.: 13/871,539

(22) Filed: Apr. 26, 2013

(65) Prior Publication Data

US 2014/0318491 A1 Oct. 30, 2014

(51) Int. Cl.
*F02F 11/00* (2006.01)
*F02F 1/24* (2006.01)

(52) U.S. Cl.
CPC .................................... *F02F 1/24* (2013.01)
USPC .... 123/193.3; 123/58.7; 123/213; 123/559.1; 123/527

(58) Field of Classification Search
USPC ............. 123/193.3, 58.7, 213, 214, 215, 216, 123/559, 52.1, 54.5, 382, 383, 527, 528, 123/559.1, 561, 58.1; 60/598
See application file for complete search history.

(56) References Cited

U.S. PATENT DOCUMENTS

| | | | |
|---|---|---|---|
| 1,601,548 A | 9/1926 | Zier et al. | |
| 1,634,468 A | 7/1927 | Muller | |
| 2,545,793 A | 3/1951 | Ricardo | |
| 2,984,966 A | 5/1961 | Harris | |
| 3,143,850 A * | 8/1964 | Foster | 60/598 |
| 3,288,123 A | 11/1966 | Stinebaugh | |
| 3,800,763 A | 4/1974 | Pouit | |
| 4,777,917 A | 10/1988 | Williams | |
| 5,072,589 A * | 12/1991 | Schmitz | 60/622 |
| 5,199,262 A | 4/1993 | Bell | |
| 6,199,369 B1 | 3/2001 | Meyer | |
| 6,318,310 B1 | 11/2001 | Clarke | |
| 6,553,977 B2 * | 4/2003 | Schmitz | 123/561 |
| 6,601,379 B1 | 8/2003 | Tomczyk | |
| 6,612,285 B2 * | 9/2003 | Ganoung | 123/308 |
| 6,698,405 B2 | 3/2004 | Bigi | |
| 7,137,381 B1 * | 11/2006 | Wakeman et al. | 123/399 |
| 7,275,511 B1 | 10/2007 | Wright et al. | |
| 7,628,013 B2 * | 12/2009 | Aikawa et al. | 60/324 |
| 7,650,870 B2 * | 1/2010 | Fisher | 123/197.4 |
| 8,036,817 B2 * | 10/2011 | Ota et al. | 701/113 |
| 8,079,214 B2 * | 12/2011 | Son et al. | 60/323 |
| 8,091,521 B2 | 1/2012 | Park | |
| 8,381,692 B2 * | 2/2013 | Islas | 123/53.2 |
| 2002/0069852 A1 * | 6/2002 | Ganoung | 123/308 |
| 2005/0252464 A1 * | 11/2005 | Aikawa et al. | 123/58.8 |
| 2007/0079778 A1 | 4/2007 | Atkinson et al. | |
| 2009/0293850 A1 * | 12/2009 | Wilflinger et al. | 123/559.3 |
| 2011/0023817 A1 * | 2/2011 | Hu | 123/254 |
| 2011/0083643 A1 * | 4/2011 | Sturman et al. | 123/46 R |

(Continued)

*Primary Examiner* — Noah Kamen
*Assistant Examiner* — Long T Tran
(74) *Attorney, Agent, or Firm* — Muskin & Farmer, LLC; Shawn R. Farmer

(57) ABSTRACT

The present engine design can comprise one or more three-cylinder modules. Each module can comprise a left-hand combustion cylinder, a compression cylinder and a right-hand combustion cylinder. In an embodiment, the compression cylinder can function as a supercharger providing compressed air to the two combustion cylinders in order to improve performance and efficiency. Each module can comprise a specialized cylinder head comprising an intake air plenum configured to allow pressurized air to flow from the compression cylinder into each of the combustion cylinders. The flow of this pressurized air can be precisely controlled by valves that control airflow into and out of each of the three cylinders. Variable valve timing and computer controls can determine the exact amount of fuel, if any, which will be injected into the combustion cylinders to deliver high fuel economy while delivering an optimal level of power, horsepower and torque.

16 Claims, 21 Drawing Sheets

(56) References Cited

U.S. PATENT DOCUMENTS

| | | | |
|---|---|---|---|
| 2011/0094462 A1* | 4/2011 | Durrett et al. | 123/58.1 |
| 2011/0265760 A1* | 11/2011 | Park | 123/403 |
| 2012/0023933 A1* | 2/2012 | Ulrey et al. | 60/605.2 |
| 2012/0048244 A1* | 3/2012 | Hayman et al. | 123/568.11 |
| 2012/0073551 A1 | 3/2012 | Branyon et al. | |
| 2012/0152191 A1* | 6/2012 | Yoshika et al. | 123/90.15 |

\* cited by examiner

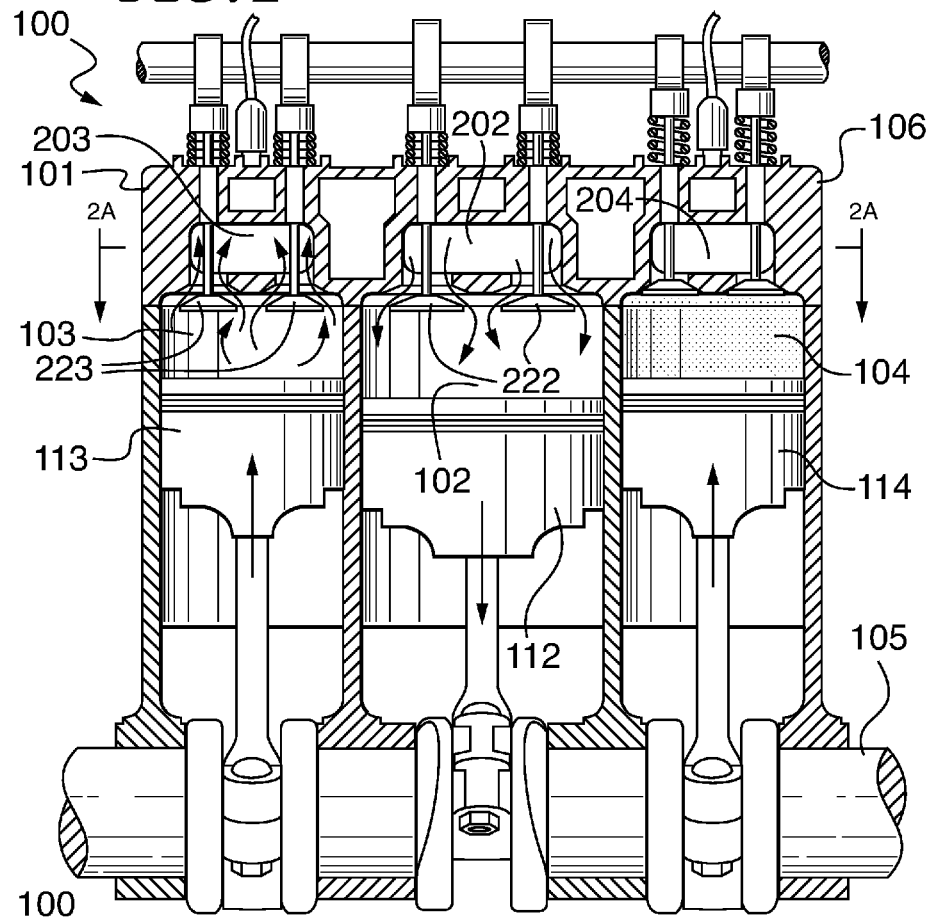
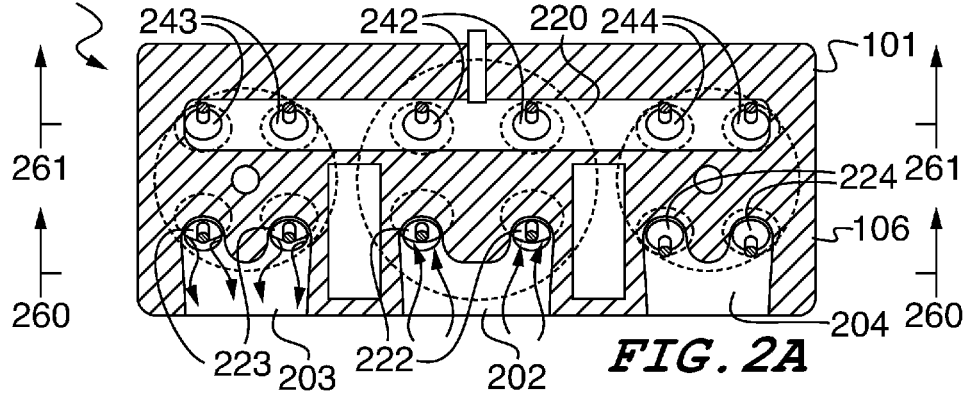

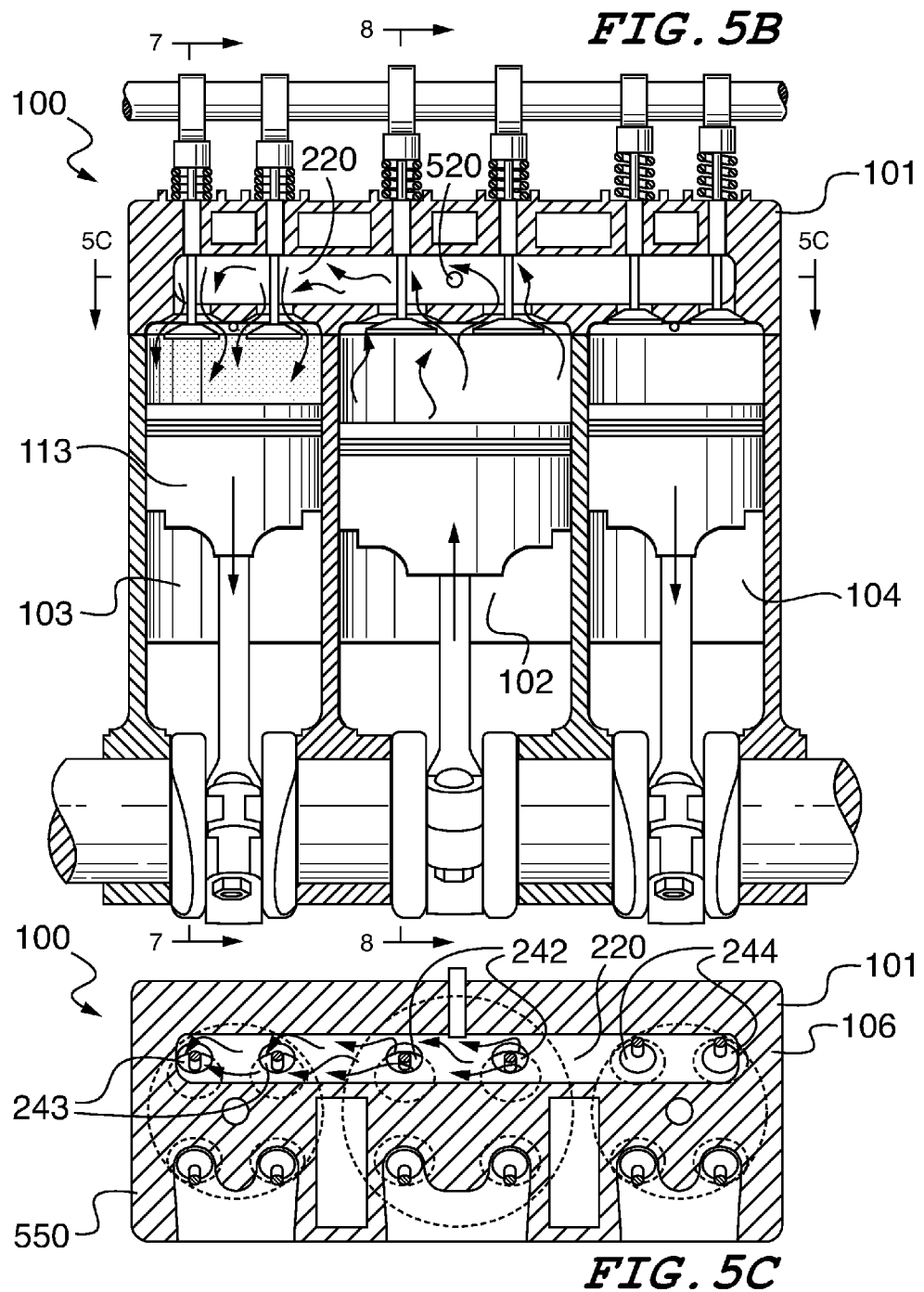

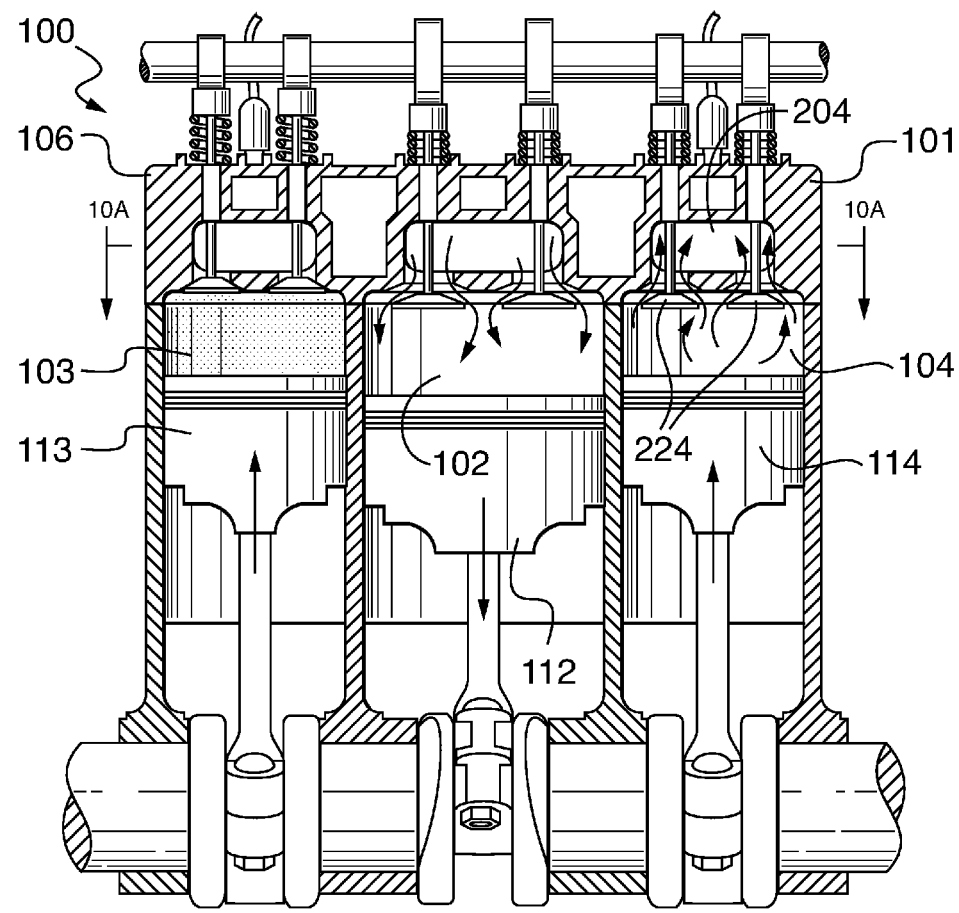
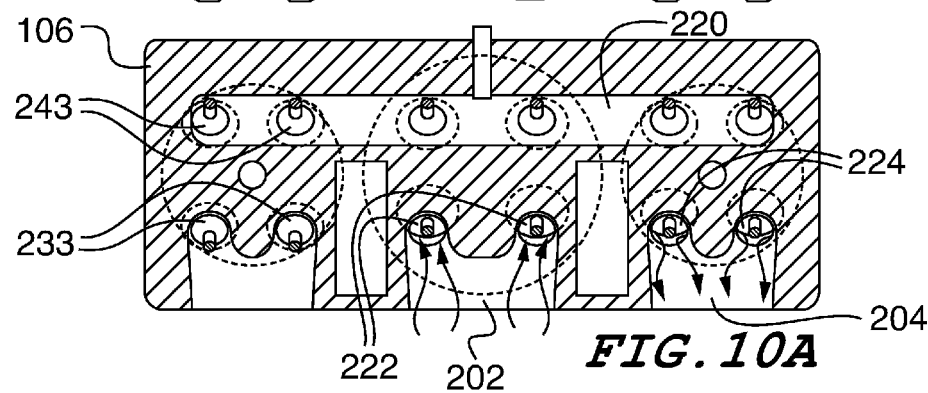

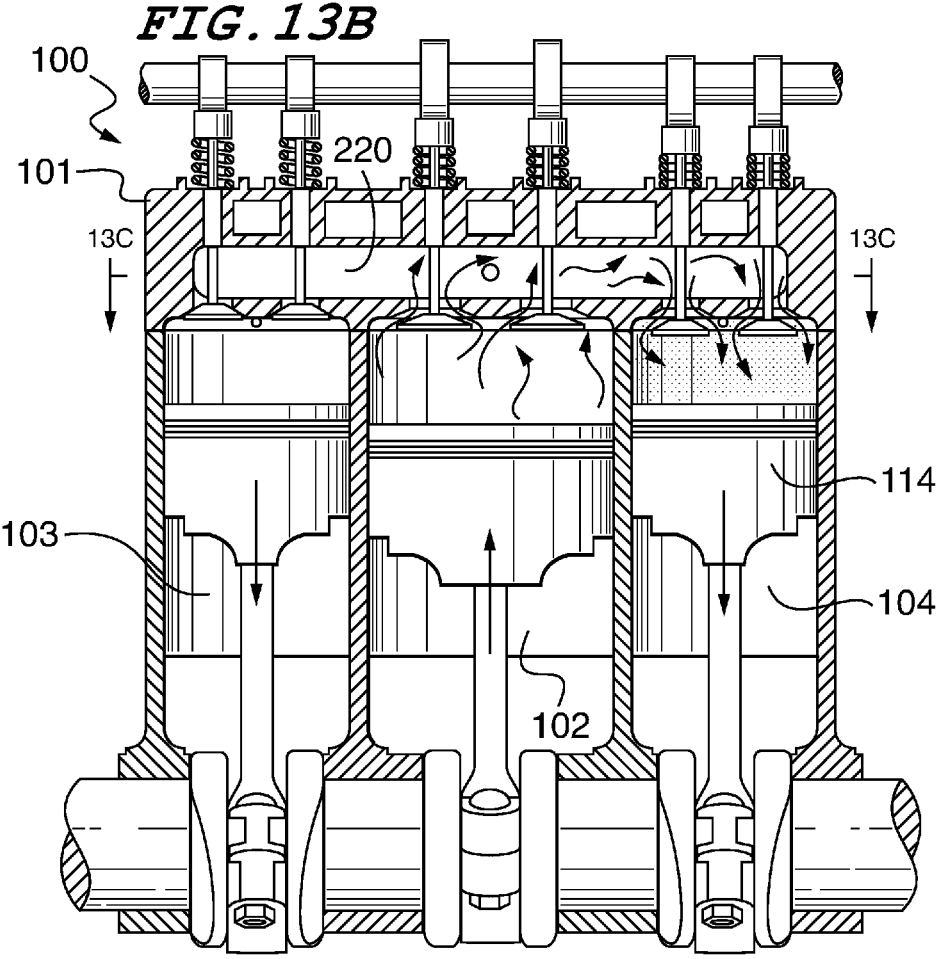
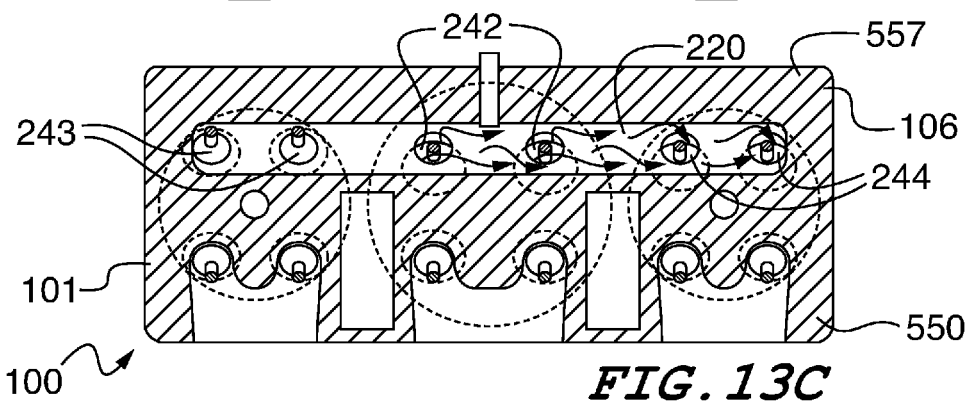

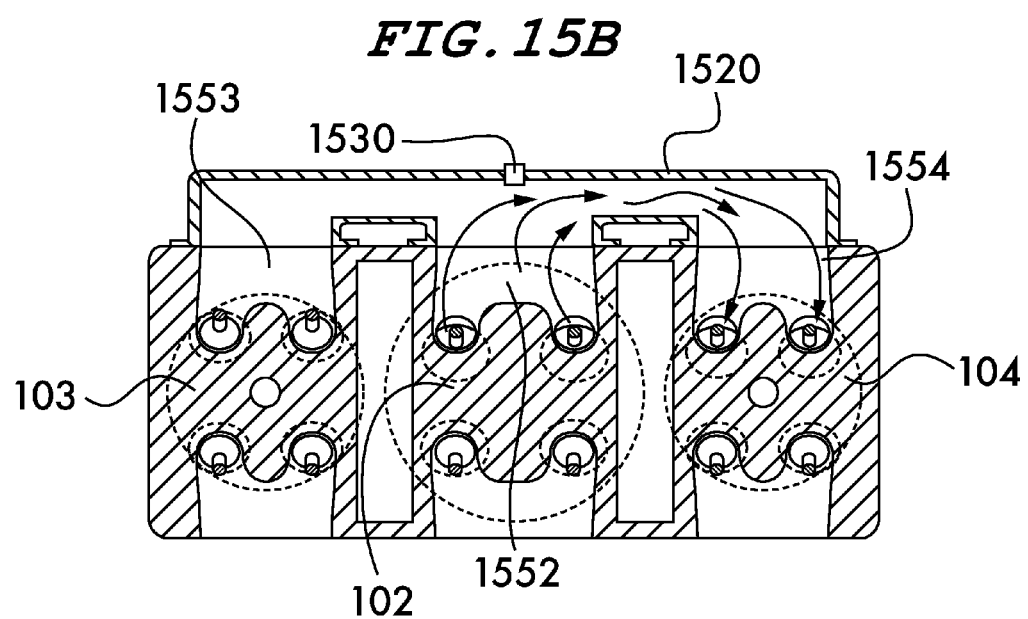

SUPERCHARGED ENGINE DESIGN

FIELD OF THE INVENTION

The present inventive concept relates to a design for a supercharged internal combustion engine. Specifically, the new engine design comprises one or more three-cylinder modules wherein one compression cylinder performs as a supercharger for the other two internal combustion cylinders.

BACKGROUND

The typical configuration of a four-stroke internal combustion engine comprises two or more cylinders, each comprising a piston, wherein each piston is attached to a single crankshaft. The four "strokes" consist of an intake stroke, a compression stroke, a power stroke and an exhaust stroke. During the intake stroke of a four-cycle engine the piston moves from the top of the cylinder to the bottom of the cylinder while one or more of the cylinder's intake valves are open. Fuel can be injected directly into the cylinder or can be injected over the open intake valves. This action draws the intake air mixture into the cylinder. The valves are then closed during the compression stroke which reverses the direction of the piston so that it moves from the bottom of the cylinder to the top of the cylinder, causing the air and fuel mixture to be pressurized. When the piston reaches its highest point in the cylinder, referred to as "top dead center" (TDC) and the pressure of the air-fuel mixture is maximized, a spark plug or other ignition source can then be used to ignite the fuel/air mixture, which forces the piston back down to the bottom of the cylinder. This downward movement of the piston is referred to as the "power stroke," which causes the crankshaft to rotate and produce power which is measured in horsepower and torque. The piston's direction of motion is then reversed again, moving back towards the top of the cylinder to push the exhaust gases out of the cylinder in the exhaust stroke through one or more of the open exhaust valves. This four-stroke cycle is repeated to produce the power necessary to operate most vehicles now commercially available throughout the world.

Due to demands from the public to lower fuel consumption, as well as increased regulations from the government, car manufacturers are constantly striving for designs that improve the efficiency of its vehicles, and particularly of its vehicle's engines. Increases in fuel efficiency could easily be met by reducing engine size or power output, which in turn would decrease the amount of fuel that is needed to produce vehicle movement. However, it is generally accepted that many consumers are not willing to sacrifice performance and power for fuel efficiency. Therefore, the focus of car manufacturers has been on designing new engine configurations that provide similar or improved power output, when compared to existing engines, while at the same time improving or maintaining fuel efficiency. One design element that has been employed to achieve this purpose is the addition of a turbocharger or supercharger.

The addition of a supercharger or turbocharger provides an increase in the amount of power produced in a cylinder of a given size during the engine's power stroke. Specifically, a supercharger or turbocharger increases the amount of air (and air pressure) in the cylinder, which increases the amount of air/fuel mixture present in the cylinder when the sparkplug, or other ignition source ignites the fuel and air mixture. This increase in the amount of air present insures more complete combustion increasing the amount of power produced with each power stroke without requiring additional fuel. In this manner the engine is said to run "lean" wherein slightly more air is present than is required for complete stoichometric combustion of the fuel.

One method of increasing the air pressure within the combustion cylinder during the compression stroke involves providing air that is at a pressure higher than atmospheric pressure during the intake stroke. In normal operation, when the piston is located at bottom dead center (BDC), the air pressure within the cylinder would be close to atmospheric pressure after completion of the intake stroke. Both superchargers and turbochargers provide air that is at a higher pressure, typically six (6) to eight (8) pounds per square inch (p.s.i.) higher than atmospheric pressure. This is due to the fact that air is being pushed into the cylinder and not merely drawn into it by the vacuum created by the downward moving piston. After the intake valves are closed, the air pressure in the cylinder is already at a pressure higher than atmospheric pressure even before the piston has begun its compression stroke. As discussed above, more highly pressurized air results in a greater amount of fuel/air mixture present when ignition occurs, which results in increased power per cubic inch of engine displacement produced by each power stroke.

Although many supercharging and turbocharging systems have been utilized and designed, these presently available systems have drawbacks. For example, turbochargers are known to have lag meaning pressing on the accelerator does not immediately cause a turbocharger to work effectively and the response in increased acceleration is delayed. This is due to the fact that turbochargers depend upon exhaust gases to drive the impellers which force intake air into the engine. Superchargers do not rely on exhaust gases to drive them, meaning that many of the problems associated with turbochargers do not apply to superchargers, however, superchargers typically have their own drawbacks. For example, superchargers, sometimes referred to as "blowers," are typically large, heavy and contain many moving parts which require more horsepower to drive the supercharger mechanism. Some of these moving parts require precision manufacturing, which can be costly and susceptible to damage and wear. Additionally, many superchargers are extremely loud and require sound dampening features which only add to the supercharger's size and weight. Superchargers are typically actuated by a belt or chain which pulls power from the motor and all belts and chains are subject to wear and stretching, which can lead to inefficiency and potential failure of the supercharger.

What is needed is an engine design that allows for an increased amount of fuel/air mixture in each combustion cylinder, as compared with normally aspirated engines, but which does not comprise the drawbacks of either currently available supercharged or turbocharged engines.

SUMMARY OF THE INVENTION

An aspect of the present device is to provide an engine design that allows for an increased amount of fuel/air mixture in each combustion cylinder, as compared with normally aspirated engines, but which does not comprise the drawbacks of either currently available supercharged or turbocharged engines.

The above aspect can be achieved by an engine design comprising: an engine block; a crankshaft; at least one three-cylinder module, the three-cylinder module comprising: a left-hand combustion cylinder located within the engine block and a left-hand combustion cylinder piston located within the left-hand combustion cylinder and connected to the crankshaft; a right-hand combustion cylinder located within the engine block and a right-hand combustion cylinder piston located within the right-hand combustion cylinder and connected to the crankshaft; and a compression cylinder located within the engine block and a compression cylinder piston located within the compression cylinder and connected to the crankshaft; and a cylinder head connected to the engine block, comprising at least one left-hand cylinder intake valve and at least one left-hand cylinder exhaust valve, at least one right-hand cylinder intake valve and at least one right-hand cylinder exhaust valve, and at least one compression cylinder intake valve and at least one compression cylinder exhaust valve, the cylinder head also comprising an intake air plenum connecting the at least one compression cylinder exhaust valve to at least one left-hand cylinder intake valve and the intake air plenum connecting the at least one compression cylinder exhaust valve to at least one at least right-hand cylinder intake valve.

The above aspect can also be achieved by an engine design comprising: an engine block; a crankshaft; at least one three-cylinder module, the three-cylinder module comprising: a left-hand combustion cylinder located within the engine block and a left-hand combustion cylinder piston located within the left-hand combustion cylinder and connected to the crankshaft; a right-hand combustion cylinder located within the engine block and a right-hand combustion cylinder piston located within the right-hand combustion cylinder and connected to the crankshaft; and a compression cylinder located within the engine block and a compression cylinder piston located within the compression cylinder and connected to the crankshaft; and a cylinder head connected to the engine block, comprising at least one left-hand cylinder intake valve and at least one left-hand cylinder exhaust valve, at least one right-hand cylinder intake valve and at least one right-hand cylinder exhaust valve, and at least one compression cylinder intake valve and at least one compression cylinder exhaust valve, the cylinder head also comprising an intake air plenum connecting at least one compression cylinder exhaust valve to at least one left-hand cylinder intake valve and the intake air plenum connecting the at least one compression cylinder exhaust valve to at least one right-hand cylinder intake valve; wherein the left-hand combustion cylinder can be in an intake stroke, compression stroke, power stroke, or exhaust stroke; wherein the right-hand combustion cylinder can be in an intake stroke, compression stroke, power stroke, or exhaust stroke; and the compression cylinder can be in an intake stroke or a compression stroke.

BRIEF DESCRIPTION OF THE DRAWINGS

Further features and advantages of the present device, as well as the structure and operation of various embodiments of the present device, will become apparent and more readily appreciated from the following description of the preferred embodiments, taken in conjunction with the accompanying drawings of which:

FIG. 2 is a cutaway side view at a first depth of a three-cylinder module comprising a four-stroke engine design wherein the left-hand combustion cylinder is in its exhaust stroke, the right-hand combustion cylinder is in its compression stroke and the compression cylinder is in its intake stroke according to an embodiment;

FIG. 2A is a cutaway top view of a three-cylinder module comprising a four-stroke engine design showing the valve positioning and airflow occurring in FIG. 2, the three-cylinder module comprising a cylinder head comprising a plenum, according to an embodiment;

FIG. 5B is a cutaway side view at a second depth of three cylinders comprising a four-stroke engine design, as shown in FIG. 5A shown just a fraction of a second after the view depicted in FIG. 4A, wherein the left-hand combustion cylinder is continuing its intake stroke, showing the valve positioning and airflow, the right-hand combustion cylinder is continuing its power stroke and the compression cylinder is continuing its compression stroke, showing the valve positioning and airflow, according to an embodiment;

FIG. 5C is a cutaway top view of a three-cylinder module comprising a four-stroke engine design, also comprising a manifold and a plenum, showing the valve positioning and airflow occurring in FIGS. 5A and 5B according to an embodiment;

FIG. 10 is a cutaway side view at a first depth of three cylinders comprising a four-stroke engine design wherein the left-hand combustion cylinder is in its compression stroke, the right-hand combustion cylinder is in its exhaust stroke and the compression cylinder is in its intake stroke according to an embodiment;

FIG. 10A is a cutaway top view of a three-cylinder module comprising a four-stroke engine design, also comprising a manifold and a plenum, showing the valve positioning and airflow occurring in FIG. 10 according to an embodiment;

FIG. 13B is a cutaway side view at a second depth of a three-cylinder module comprising a four-stroke engine design, as shown in FIG. 13A shown just a fraction of a second after the view depicted in FIG. 12A, wherein the left-hand combustion cylinder is continuing its power stroke, the right-hand combustion cylinder is continuing its intake stroke, showing the valve positioning and airflow, and the compression cylinder is continuing its compression stroke, showing the valve positioning and airflow, according to an embodiment;

FIG. 13C is a cutaway top view of a three-cylinder module comprising a four-stroke engine design, also comprising a manifold and a plenum, showing the valve positioning and airflow occurring in FIGS. 13A and 13B according to an embodiment;

FIG. 15B is a cutaway top view of a three-cylinder module comprising a four-stroke engine design, as shown in FIG. 15A, the three-cylinder module comprising an external intake plenum, according to an alternative embodiment.

DETAILED DESCRIPTION

Figure 1:
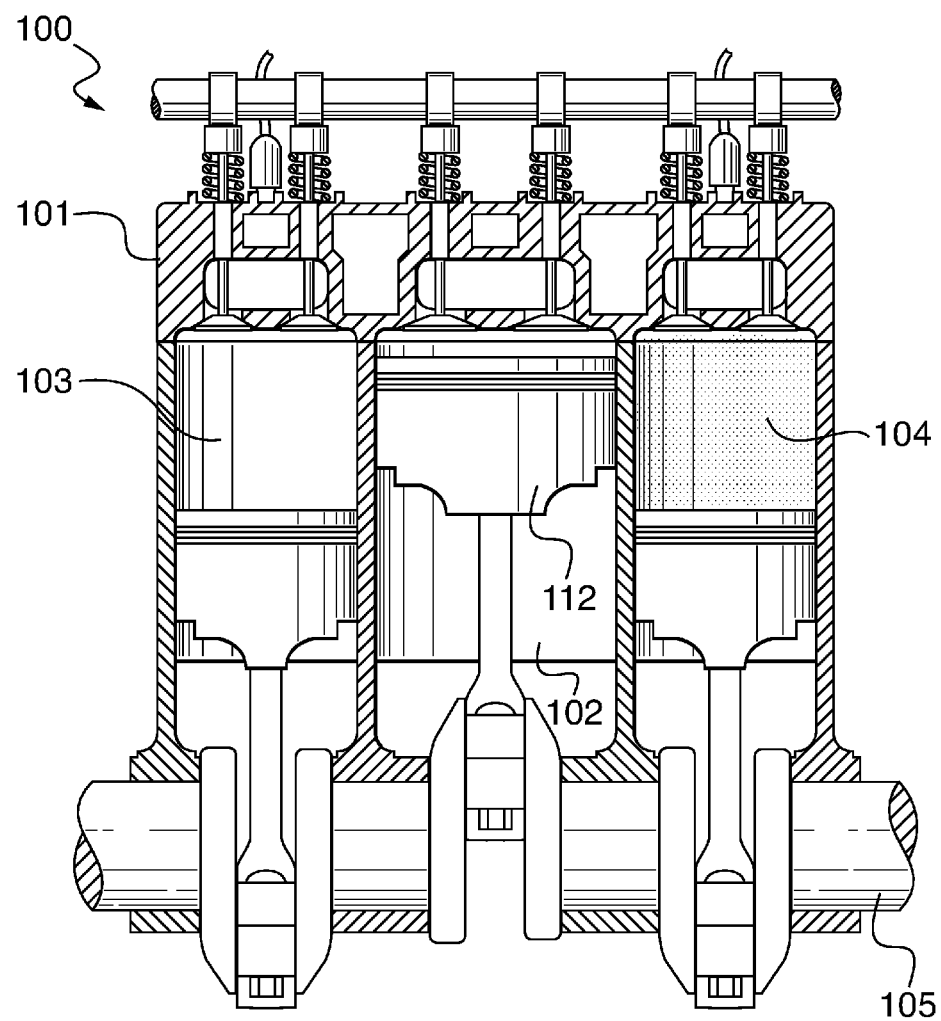
FIG. 1 is a cutaway side view at a first depth of a three-cylinder module comprising a four-stroke engine design wherein the left-hand combustion cylinder has just completed its power stroke, the right-hand combustion cylinder has just completed its intake stroke and the compression cylinder has just completed its compression stroke according to an embodiment.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

The present engine design can comprise at least one three-cylinder module comprising a cylinder block, the cylinder block further comprising one compression cylinder and two combustion cylinders. In an embodiment, this three-cylinder module can also comprise a cylinder head comprising an intake plenum configured to allow air to flow from the compression cylinder to each of the two combustion cylinders. Although the present engine design is explained using one three-cylinder module, multiple modules can comprise a single engine having six, nine, twelve, or more cylinders. In the present design, a cylinder head can be configured to allow for the intake of air into a compression cylinder. This air can then be pressurized within the compression cylinder and move from the compression cylinder to one of the combustion cylinders through the intake air plenum at a positive pressure. Precise valve timing can insure that air flows only from the compression cylinder to the combustion cylinders and never from the combustion cylinders to the compression cylinder. Such flow, referred to as backflow or backwash, can result in the loss of air pressure and a reduced amount of air in the combustion cylinders. Variable valve timing and computer controls can also be used to determine the exact amount of fuel, if any, which will be injected into the combustion cylinders to deliver high fuel economy while delivering an optimal level of power, horsepower and torque.

The present engine design can eliminate many of the drawbacks associated with presently available turbochargers and superchargers due to the fact that the supercharger is integrated into the engine rather than being a separate machine than is externally connected to it. Specifically, the present supercharging system should not be subject to the lag experiences by turbochargers as the compression cylinder can provide pressurized air to each cylinder during its compression stroke. Additionally, the present supercharging design can be smaller, lighter and have fewer moving parts than present superchargers, which are typically mounted onto the engine. Moreover, as a piston within the engine, the compression cylinder, comprising each three-cylinder module can be more rugged than superchargers that rely on drive belts or chains.

The 3-cylinder engine module in this example could have a displacement of 500 cc per combustion cylinder and 850 cc for the compressor cylinder. This can give a ratio of compressor cylinder displacement to combustion cylinder displacement of 1.7 (850 cc÷500 cc). Whereas a normally aspirated engine should have a power output of 60 to 80 horsepower per liter of combustion cylinder displacement, the present 3-cylinder design could have an expected power output in the range of 120 to 180 horsepower per liter. Although a standard internal combustion engine is used to explain the features and functions of the present engine design, it is contemplated that the present engine design will be capable of operating using a variety of different fuels, including but not limited to: gasoline, diesel, and Flex Fuel, e.g. "E85."

Reference will now be made in detail to the presently preferred embodiments of the present four-stroke engine design, examples of which are illustrated in the accompanying drawings, wherein like reference numerals refer to like elements throughout.

FIG. 1 is a cutaway side view at a first depth 260 (as shown in FIG. 2A) of a three-cylinder module 101 comprising a four-stroke engine design 100 wherein the left-hand combustion cylinder 103 has just completed its power stroke and the piston is at bottom dead center (BDC), the right-hand combustion cylinder 104 has just completed its intake stroke, and its piston is also at BDC, and the compression cylinder 102 has just completed its compression stroke, and its piston is at top dead center (TDC) according to an embodiment. The engine design 100 can comprise at least one three-cylinder module 101. In an embodiment, the three-cylinder module 101 can comprise a compression cylinder 102, a first, or left-hand, combustion cylinder 103 and a second, or right-hand, combustion cylinder 104. In the three-cylinder module 101, cylinders can be arranged so that the first and second combustion cylinders, 103 and 104, can be located on opposite sides of the compression cylinder 102. In some embodiments, the compression cylinder 102 can comprise a larger internal volume than the internal volumes of each combustion cylinder, 103 and 104. This increased internal volume can be achieved either by increasing the diameter of the compression cylinder 102 relative to the combustion cylinders, 103 and 104 or both, and/or lengthening the stroke of the compression piston 112—'stroke' is the distance that a piston moves up and down within a cylinder—relative to the strokes of the two combustion cylinders, 103 and 104. Note that adjusting the stroke would necessitate altering the properties of the crankshaft 105. In an embodiment, each of the combustion cylinders, 103 and 104, can have an identical internal volume. The internal volume of the compression cylinder 102 can be within a range of approximately 1.2 to 1.9 times the internal volume of either of the combustion cylinders, 103 or 104, and can be configured to create pressures within the combustion cylinders, 103 and 104 of approximately 20 to 24 pounds per square inch before compression in the combustion cylinders begins according to an embodiment.

FIG. 2 is a cutaway side view at a first depth 260 (as shown in FIG. 2A) of a three-cylinder module 101 comprising a four-stroke engine design 100 wherein the left-hand combustion cylinder 103 is in its exhaust stroke, the right-hand combustion cylinder 104 is in its compression stroke and the compression cylinder 102 is in its intake stroke according to an embodiment. FIG. 2 depicts the direction of movement of the combustion pistons, 113 and 114, and the compression piston 112 as well as the airflow and valve positioning, as each would appear moments after their relative positions as depicted in FIG. 1. Specifically, both the left-hand combustion cylinder piston 113 and right-hand combustion cylinder 114 are moving upward toward TDC and the compression cylinder piston 112 is moving downward toward BDC.

The compression cylinder 102 and the first and second combustion cylinders, 103 and 104, can be connected to one another through the use of a specially designed cylinder head 106. The cylinder head 106 can comprise an intake port 202, which can be configured to allow air to pass into the three cylinder module 101. Specifically, air can flow through the intake port 202 and into the compression cylinder 102. The cylinder head 106 can also comprise a left-hand combustion cylinder exhaust port 203 and a right-hand combustion cylinder exhaust port 204, which can each be configured to allow exhaust from these combustion cylinders to pass from these combustion cylinders, 103 and 104, and from the three-cylinder module 101 generally.

In FIG. 2 airflow, in the form of exhaust gasses, is depicted as curved arrows flowing from the left-hand combustion cylinder 103 into the cylinder head 106 and the left-hand combustion cylinder exhaust port 203. In an embodiment, this airflow can be created by the upward movement of the left-hand combustion cylinder piston 113, which pushes these exhaust gasses out of the left-hand combustion cylinder 103, through the left-hand exhaust valves 223, and into the left-hand combustion cylinder exhaust port 203 of the cylinder head 106.

Also in FIG. 2, airflow into the compression cylinder 102 is indicated by slightly longer curved arrows. Air can be drawn into the compression cylinder 102 by the downward motion of the compression cylinder piston 112, which can draw air into the three cylinder module 101 by pulling it through the intake port 202 through one or more compression cylinder intake valves 222 and into the compression cylinder 102.

No intake or exhaust airflow is occurring in the right-hand combustion cylinder 104 as its intake and exhaust valves are closed during the compression stroke as the fuel/air mixture, indicated by shading, is compressed prior to ignition according to an embodiment.

FIG. 2A is a cutaway top view of three-cylinder module 101 comprising a four-stroke engine design 100, comprising a cylinder head 106 further comprising a plenum 220, showing the valve positioning and airflow occurring in FIG. 2 according to an embodiment. In this view, exhaust flowing from the left-hand combustion cylinder exhaust port 203 and intake air into the intake port 202 can clearly be seen. Additionally, this view shows the plenum 220 comprising the cylinder head 106. This view shows the location of first depth 260 and second depth 261, which refer to the respective planes at which the side, cut-away views of each three-cylinder module 101 in the are taken.

The plenum 220 can be a chamber configured to allow airflow from the compression cylinder 102 shown in FIG. 2 to the two combustion cylinders, 103 and 104 shown in FIG. 2, and act as a storage vessel capable of momentarily storing pressurized air received from the compression cylinder 102. In an embodiment, pressurized air can flow from the compression cylinder 102 through one or more compression cylinder exhaust valves 242 then flow into one or more left-hand intake valves 243 or one or more right-hand intake valves 244 depending on which combustion cylinder is in its intake stroke. Although, the compression cylinder 102 and the two combustion cylinders, 103 and 104, are shown as having four valves each, two intake valves and two exhaust valves, embodiments comprising any number of valves are contemplated as being acceptable variations of the present inventive concept. In an embodiment, the plenum can be located within the cylinder head 106 as shown in FIG. 2A.

Figure 3:
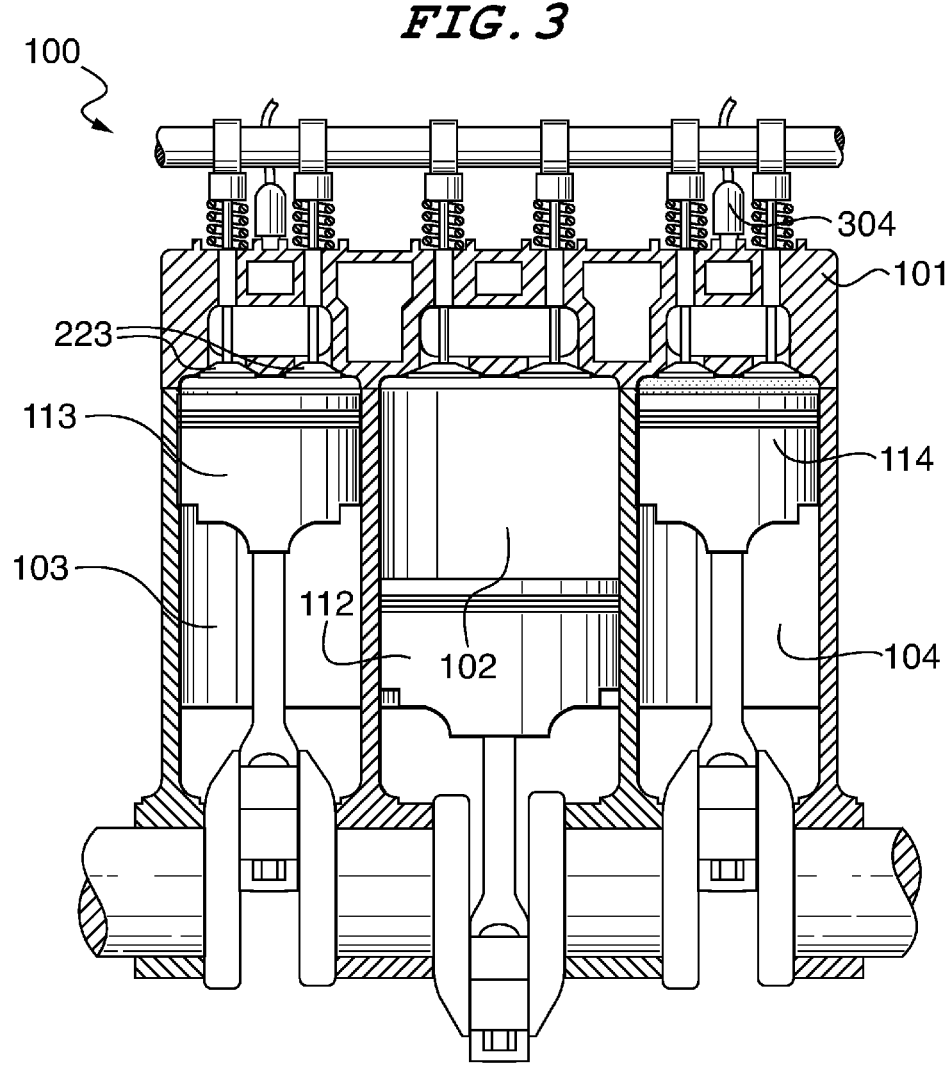
FIG. 3 is a cutaway side view at a first depth of a three-cylinder module comprising a four-stroke engine design wherein the left-hand combustion cylinder has completed its exhaust stroke, the right-hand combustion cylinder has completed its compression stroke and the compression cylinder has just completed its intake stroke according to an embodiment.

FIG. 3 is a cutaway side view at a first depth 260 (shown in FIG. 2A) of a three-cylinder module 101 comprising a four-stroke engine design 100 wherein the left-hand combustion cylinder 103 has completed its exhaust stroke, the right-hand combustion cylinder 104 has completed its compression stroke and the compression cylinder 102 has just completed its intake stroke according to an embodiment.

At this point in the engine's cycle, all of the valves comprising the three-cylinder module are closed. Both the left-hand combustion cylinder piston 113 and the right-hand combustion cylinder piston 114 are at TDC. The spent air and fuel mixture from the left-hand combustion cylinder 103 has been exhausted through the left-hand exhaust valves 223. In the right-hand combustion cylinder 104, the fuel/air mixture is at a maximum compression and the point of ignition. As with any typical internal combustion engine, ignition can be provided by a spark plug 304, as shown in FIG. 3, or by any other suitable ignition source, or no ignition source in the case of diesel engines. This ignition marks the end of the compression stroke and the beginning of the power stroke for the right-hand combustion cylinder 104. The compression piston 112 is at BDC and the compression cylinder 102 is filled with air that is at or near atmospheric pressure. In an embodiment, ignition can occur slightly before each combustion piston, 113 and 114, reach TDC.

Figure 4A:
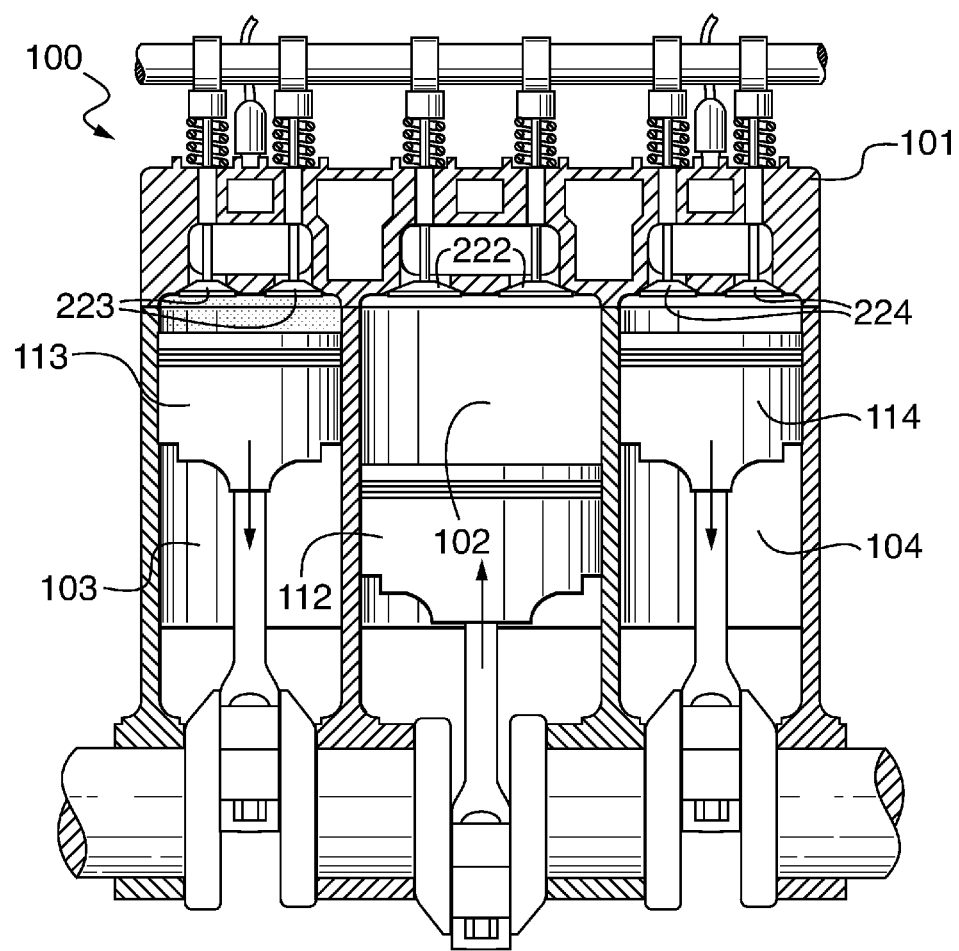
FIG. 4A is a cutaway side view at a first depth of a three-cylinder module comprising a four-stroke engine design wherein the left-hand combustion cylinder is beginning its intake stroke, the right-hand combustion cylinder is beginning its power stroke after ignition by the spark plug and the compression cylinder is beginning its compression stroke according to an embodiment.

FIG. 4A is a cutaway side view at a first depth 260 (shown in FIG. 2A) of the three-cylinder module 101 comprising a four-stroke engine design 100 wherein the left-hand combustion piston 113 is beginning its intake stroke, the right-hand combustion piston 114 is beginning its power stroke after ignition and the compression piston 112 is beginning its compression stroke according to an embodiment. FIG. 4A depicts the direction of movement of the combustion pistons, 113 and 114, and the compression piston 112 as each would appear moments after their relative positions as depicted in FIG. 3. Specifically, both the left-hand combustion piston 113 and right-hand combustion piston 114 are moving downward toward BDC and the compression piston 112 is moving upward toward TDC. At this point in the engine's cycle, the left-hand exhaust valves 223, the right-hand exhaust valves 224 and the compression cylinder intake valves 222 are all closed, according to an embodiment. The air/fuel mixture is depicted as shading in the left-hand combustion cylinder 103.

Figure 4B:
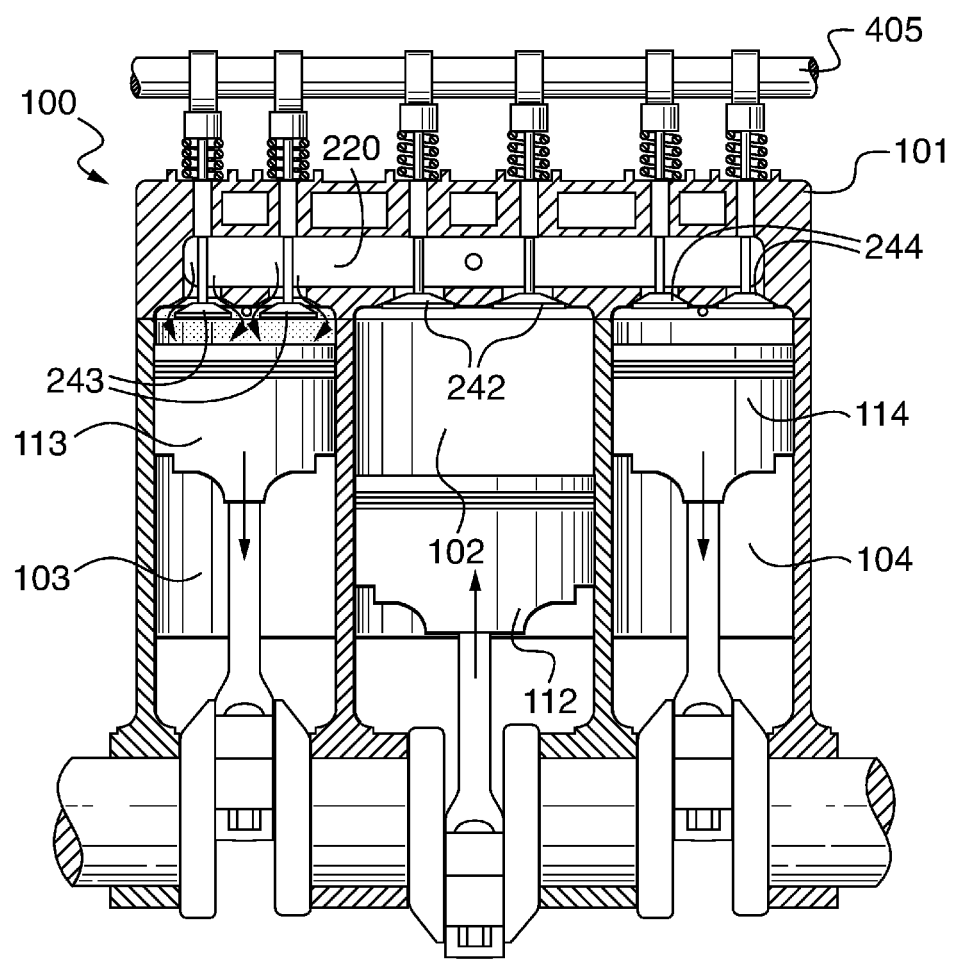
FIG. 4B is a cutaway side view at a second depth of a three-cylinder module comprising a four-stroke engine design, as shown in FIG. 4A, wherein the left-hand combustion cylinder is beginning its intake stroke, showing the valve positioning and airflow, the right-hand combustion cylinder is beginning its power stroke after ignition by the spark plug and the compression cylinder is beginning its compression stroke according to an embodiment.

FIG. 4B is a cutaway side view at a second depth 261 (shown in FIG. 2A) of the three-cylinder module 101 comprising a four-stroke engine design 100, as shown in FIG. 4A, wherein the left-hand combustion piston 113 is beginning its intake stroke, showing the valve positioning and airflow, the right-hand combustion piston 114 is beginning its power stroke after ignition and the compression piston 112 is beginning its compression stroke according to an embodiment. To be clear, FIG. 4B is showing the cutaway side view at a second depth 261 while FIG. 4A is showing the cutaway side at a first depth 260 as shown in FIG. 2A. This view shows the positions of the compression cylinder exhaust valves 242 and the left-hand intake valves 243 and right-hand intake valves 244. Airflow, depicted as short curved arrows, is shown flowing from the plenum 220 past the left-hand intake valves 243 and into the left-hand combustion cylinder 103. In an embodiment, the air moving from the intake plenum 220 into the left-hand combustion cylinder 103 could be pressurized to approximately 20 to 24 pounds per square inch.

In an embodiment, both the compression cylinder intake valve 222 (shown in FIG. 4A) and the compression cylinder exhaust valves 242 can remain closed while the compression cylinder 112 begins its upward movement from BDC to TDC. This allows some pressure to be created within the compression cylinder 102 before the cylinder exhaust valves 242 are opened and pressurized air is allowed to flow into the intake air plenum 220. The purpose of this valve delay is to prevent any back flow from the combustion cylinders, 103, and 104, into the compression cylinder 102. Note that as with other standard internal combustion engines, the valves in the present engine design 100 can be controlled by one or more camshafts 405. However, alternative designs, which do not require the use of camshafts, could also be used.

Figure 5A:
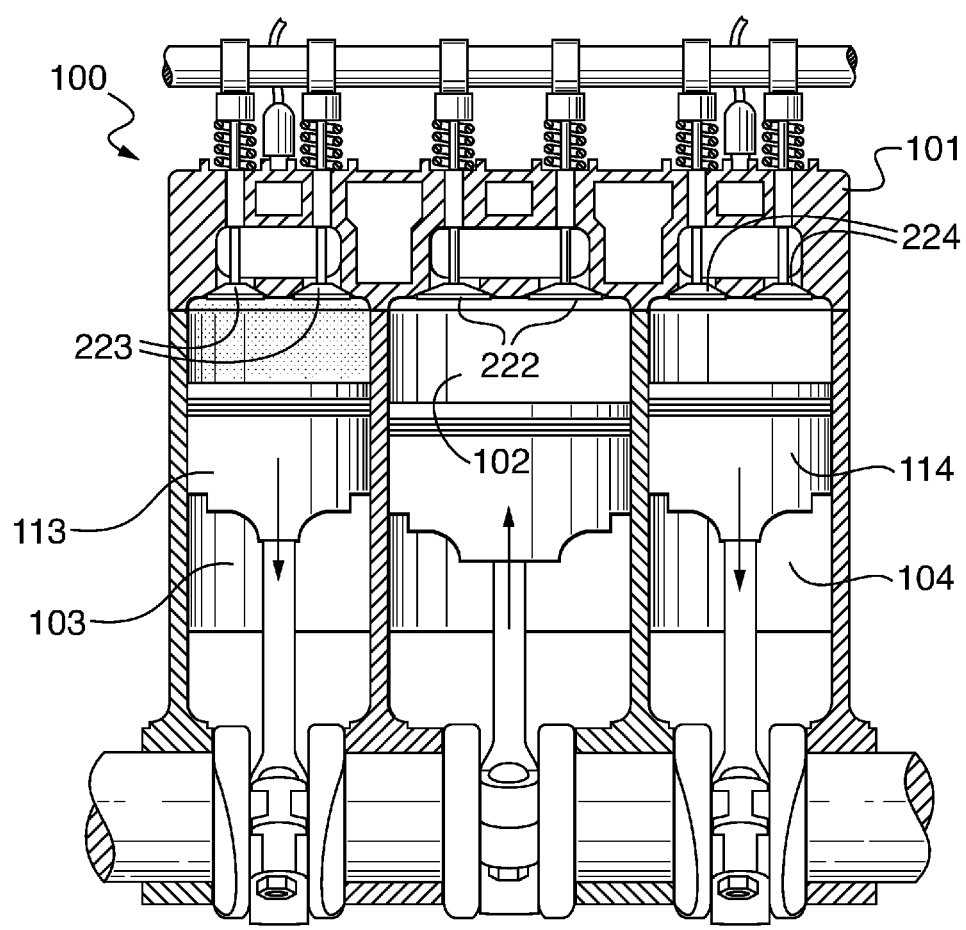
FIG. 5A is a cutaway side view at a first depth of three cylinders comprising a four-stroke engine design, shown just a fraction of a second after the view depicted in FIG. 4A, wherein the left-hand combustion cylinder is in its intake stroke, the right-hand combustion cylinder is in its power stroke and the compression cylinder is in its compression stroke according to an embodiment.

FIG. 5A is a cutaway side view at a first depth 260 (shown in FIG. 2A) of a first side of a three-cylinder module 101 comprising a four-stroke engine design 100, shown just a fraction of a second after the view depicted in FIG. 4A, wherein the left-hand combustion cylinder 103 is in its intake cycle, the right-hand combustion cylinder 104 is in its power stroke cycle and the compression cylinder 102 is in its compression stroke according to an embodiment. Both the left-hand combustion cylinder piston 113 and the right-hand combustion cylinder piston 114 have moved into positions slightly closer to BDC than their respective positions in FIG. 4A. All of the combustion cylinder exhaust valves, 223 and 224, as well as the compression cylinder intake valves 222 remain closed at this point in the cycle.

FIG. 5B is a cutaway side view at a second depth 261 (shown in FIG. 2A) of a second side of a three-cylinder module 101 comprising a four-stroke engine design 100, as shown in FIG. 5A shown just a fraction of a second after the view depicted in FIG. 4A, wherein the left-hand combustion cylinder 103 is continuing its intake cycle, showing the valve positioning and airflow, the right-hand combustion cylinder 104 is continuing its power stroke and the compression cylinder 102 is continuing its compression stroke, showing the valve positioning and airflow, according to an embodiment. In this view, airflow is shown moving from the compression cylinder 102, into the intake air plenum 220 and into the left-hand combustion cylinder 103. This compressed air is added to the fuel injected into the left-hand combustion cylinder 103 when the left-hand combustion cylinder piston 113 is just past TDC to generate the desired fuel/air mixture within the cylinder 103.

In an embodiment the intake air plenum 220 can comprise a pressure relief port 520 configured to allow air to pass through if/when pressure in intake air plenum 220 exceeds a predetermined level. The purpose of this pressure release port 520 can be both to improve safety by reducing the likelihood of an explosion and to reducing the likelihood that over-pressurized air will damage the engine 100.

FIG. 5C is a cutaway top view of a three-cylinder module 101 comprising a four-stroke engine design 100, also comprising a cylinder head 106 further comprising an intake air plenum 220, showing the valve positioning and airflow occurring in FIGS. 5A and 5B according to an embodiment. All valves on the first side 550 of the cylinder head 106 can be closed at this point in the cycle. However, on the second side (not shown in FIG. 5B but visible in FIG. 5C) of the cylinder head 106, both the left-hand intake valves 243 and the compression cylinder exhaust valves 242 can be open to allow airflow from the compression cylinder 102 into the left-hand combustion cylinder 103. The right-hand intake valves 244 can be closed in this embodiment.

Figure 6A:
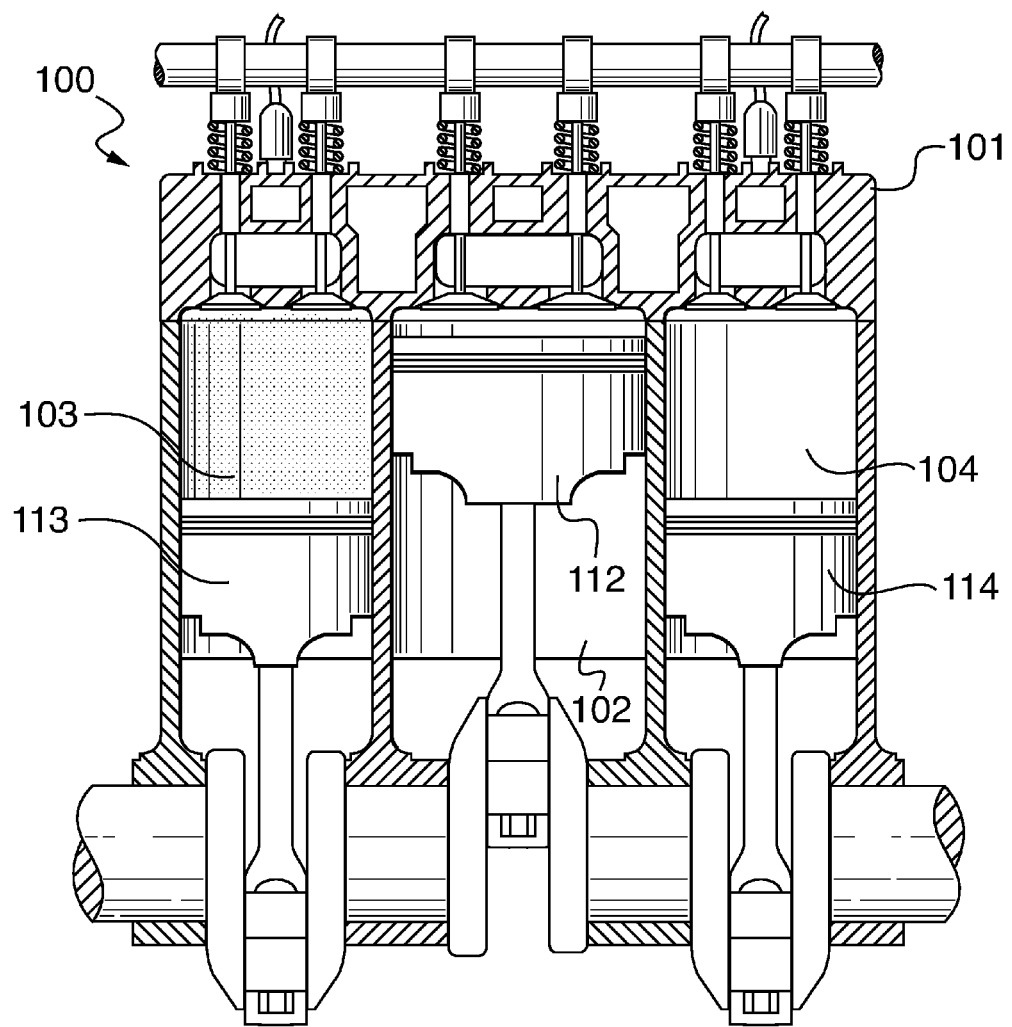
FIG. 6A is a cutaway side view at a first depth of a three-cylinder module comprising a four-stroke engine design, wherein the left-hand combustion cylinder has completed its intake stroke, the right-hand combustion cylinder has completed its power stroke and the compression cylinder has completed its compression stroke according to an embodiment.

FIG. 6A is a cutaway side view at a first depth 260 (shown in FIG. 2A) of a first side of the three-cylinder module 101 comprising a four-stroke engine design 100, wherein the left-hand combustion piston 113 has completed its intake stroke, the right-hand combustion piston 114 has completed its power stroke and the compression piston 112 has completed its compression stroke according to an embodiment. FIG. 6A shows the relative positions of the components comprising the three-cylinder module 101 just a fraction of a second after the view depicted in FIG. 5A. Specifically, both the left-hand combustion cylinder piston 113 and the right-hand combustion cylinder piston 114 are at BDC and the compression cylinder piston 112 is at TDC. In the embodiment, as shown in the figures, the compression piston 112 and the two combustion cylinder pistons, 113 and 114 are one-hundred eighty (180) degrees out of phase. All valves comprising the three-cylinder module 101 can be closed at this stage of the cycle.

Figure 6B:
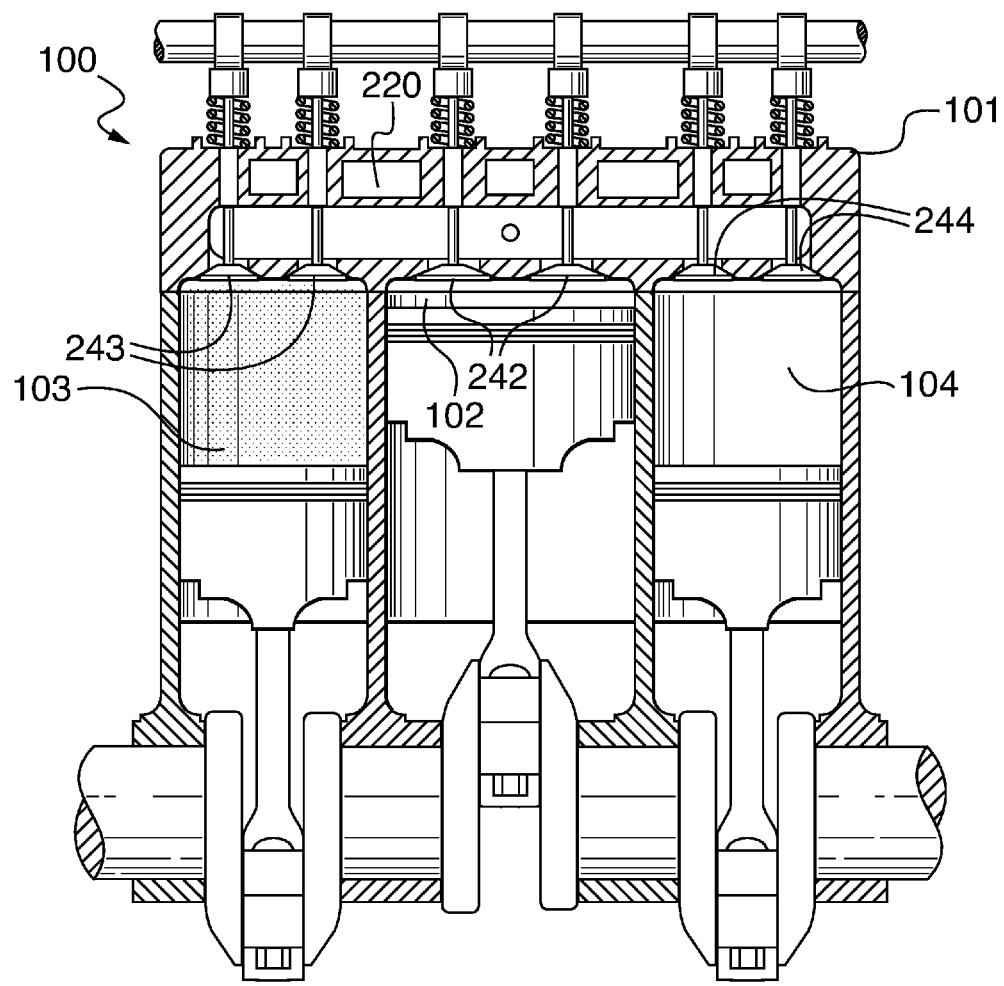
FIG. 6B is a cutaway side view at a second depth of a three-cylinder module comprising a four-stroke engine design, as shown in FIG. 6A, wherein the left-hand combustion cylinder has completed its intake stroke, the right-hand combustion cylinder has completed its power stroke and the compression cylinder has completed its compression stroke according to an embodiment.

FIG. 6B is a cutaway side view at a second depth 261 (as shown in FIG. 2A) of a three-cylinder module 101 comprising a four-stroke engine design 100, as shown in FIG. 6A, wherein the left-hand combustion cylinder 103 has completed its intake stroke, the right-hand combustion cylinder 104 has completed its power stroke and the compression cylinder 102 has completed its compression stroke according to an embodiment. The pistons and cylinders are shown at the same positions as in FIG. 6A. All valves on the second side of the three-cylinder module 101, including the compression cylinder exhaust valves 242, the left-hand intake valves 243, and right-hand intake valves 244, can also be closed at this point, meaning no airflow can occur either into or out from the intake air plenum 220 at this point in the engine's cycle.

Figure 7:
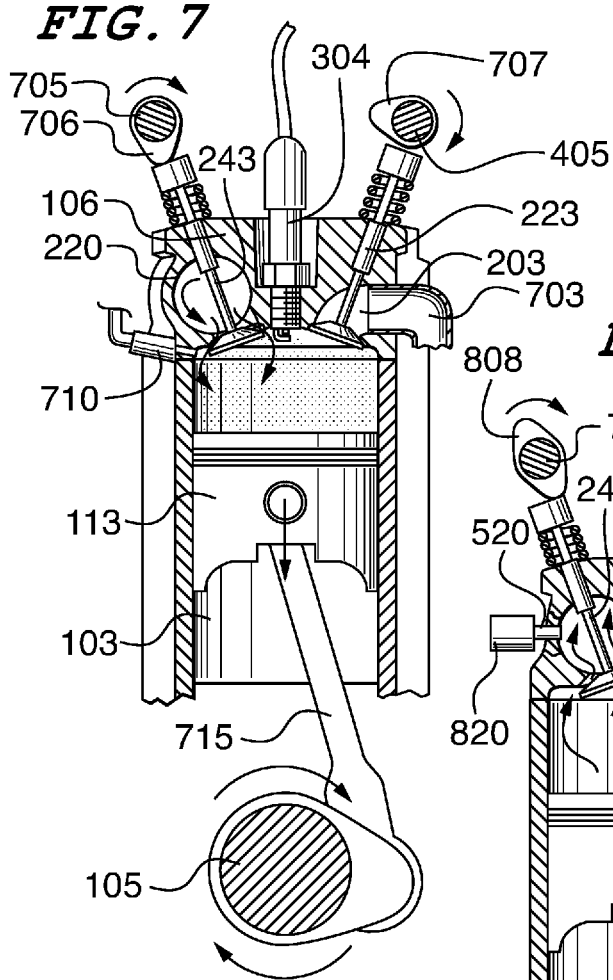
FIG. 7 is a cutaway side view of the left-hand combustion cylinder shown in FIGS. 5A and 5B according to an embodiment.

FIG. 7 is a cutaway front view of the left-hand combustion cylinder 103 shown in FIGS. 5A and 5B according to an embodiment. Specifically, FIG. 7 shows the position of the left-hand combustion cylinder piston 113 within the left-hand combustion cylinder 103 as depicted in FIGS. 5A and 5B, which shows the cylinder's 103 intake stroke.

One of the two left-side intake valves 243 is shown in an open position and airflow, from the intake air plenum 220 into the left-side combustion cylinder 103, is shown by curved arrows. This airflow, in addition to fuel added by the fuel injector 710 can mix in the cylinder 103 to create the desired fuel/air mixture. In this embodiment, the intake air plenum 220 is shown as having a cylindrical shape, however, any suitable shape that can achieve the same purpose, namely allowing air to flow from the compression cylinder (not shown in FIG. 7) to each of the combustion cylinders, 103 and 104 (not shown in FIG. 7), would also be acceptable. In the depicted embodiment, the left-side intake valve 243 can be actuated by a second side camshaft 705 having at least one single-lobed cam 706 configured to operate each left-side intake valve 243. Similarly, one of the left-side exhaust valves 223 is shown in a closed position. Each left-side exhaust valve 223 is also actuated by a second side camshaft 405 comprising a single-lobed cam 707. In this embodiment, the intake valves and the exhaust valves are actuated by different camshafts, a first side camshaft 405 can actuate the compression cylinder intake valves 222 (not shown in FIG. 7), the left-hand exhaust valves 223, and right-hand exhaust valves 224 and the second side camshaft 705 can actuate the compression cylinder exhaust valves 242, the left-hand intake valves 243, and right-hand intake valves 244. However, the valves on both sides could be actuated by a single camshaft or no camshaft at all in some alternative embodiments. This figure also allows the left-side exhaust port 203 and the attached exhaust manifold 703 to be viewed. The combustion cylinder spark plug 304 and its position within the cylinder head 106 can also be seen in this view. The relative position and rotational direction of the crankshaft 105 is also shown in FIG. 7.

Although not shown in the figures, the relative positions of the piston, valves, fuel injector and other components could apply equally to the right-side combustion cylinder 104. Note, however, that the valve positions, i.e., open or closed, and the related camshaft positions would not be the same because cylinder 104 would be in its exhaust stroke when the left-hand combustion cylinder 103 in FIG. 7 is in its compression stroke.

Figure 8:
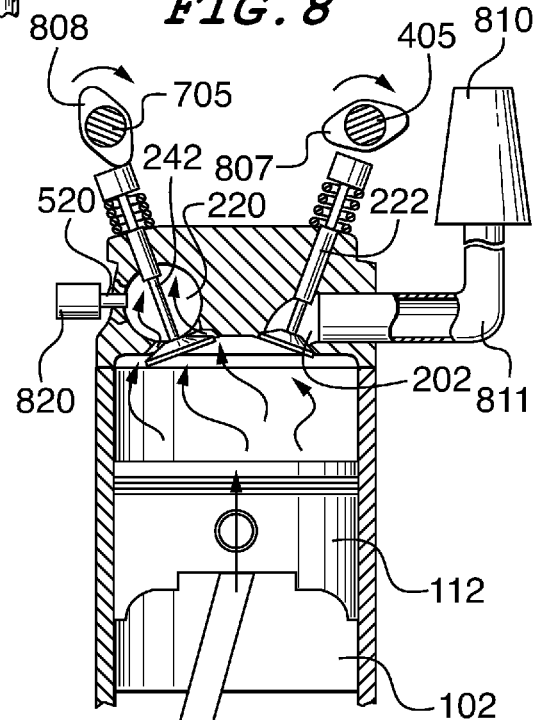
FIG. 8 is a cutaway side view of the compression cylinder shown in FIGS. 5A and 5B according to an embodiment.

FIG. 8 is a cutaway side view of the compression cylinder 102 shown in FIGS. 5A and 5B according to an embodiment. FIG. 8 shows the position of the compression cylinder piston 112 within the compression cylinder 102 as depicted in FIGS. 5A and 5B, which shows the compression cylinder's 102 compression stroke.

In FIG. 8, airflow, depicted as curved arrows, can be seen flowing from the compression cylinder 102 into the intake air plenum 220. (This air then flows through the intake air plenum 220 into the left-hand combustion cylinder 103 shown in FIG. 7.) This air had been pulled into the compression cylinder 102 during the intake stroke shown in FIG. 2. In an embodiment, air is pulled into the compression cylinder 102 through an air filter 810 connected to an intake manifold 811 which is connected to the intake port 202. Airflow from the intake port 202 into the compression cylinder 102 can be controlled by one or more compression cylinder intake valves 222. In an embodiment, each compression cylinder intake valve 222 can be actuated by a first side camshaft 405 having at least one dual-lobe cam 807. This dual-lobe cam 807 can cause the compression cylinder intake valve 222 to open two times during each full rotation of the first side camshaft 405, whereas the single-lobe cam 707 (shown in FIG. 7) can allow each left-hand exhaust valve 223 (shown in FIG. 7) to open only once. The reason for this difference being that the compression cylinder 102 must provide a compression stroke during the intake strokes for both the left-side combustion cylinder 103 and the right-side combustion cylinder 104.

Similarly, airflow from the compression cylinder 102 into the intake air plenum 220 can be controlled by one or more compression cylinder exhaust valves 242 which can also be actuated by a camshaft, in this case the second side camshaft 705, having at least one dual-lobe cam 808. In an embodiment, a plenum pressure release valve 820 can be connected to the pressure release port 520. This plenum pressure release valve 820 can be configured to allow only a set maximum amount of air pressure to exist within the intake air plenum 220. In an embodiment, this plenum pressure release valve 820 can be set at approximately 28 to 30 PSI (pounds per square inch), wherein it will release air from the intake air plenum 220 if this pressure is exceeded.

Figure 9:
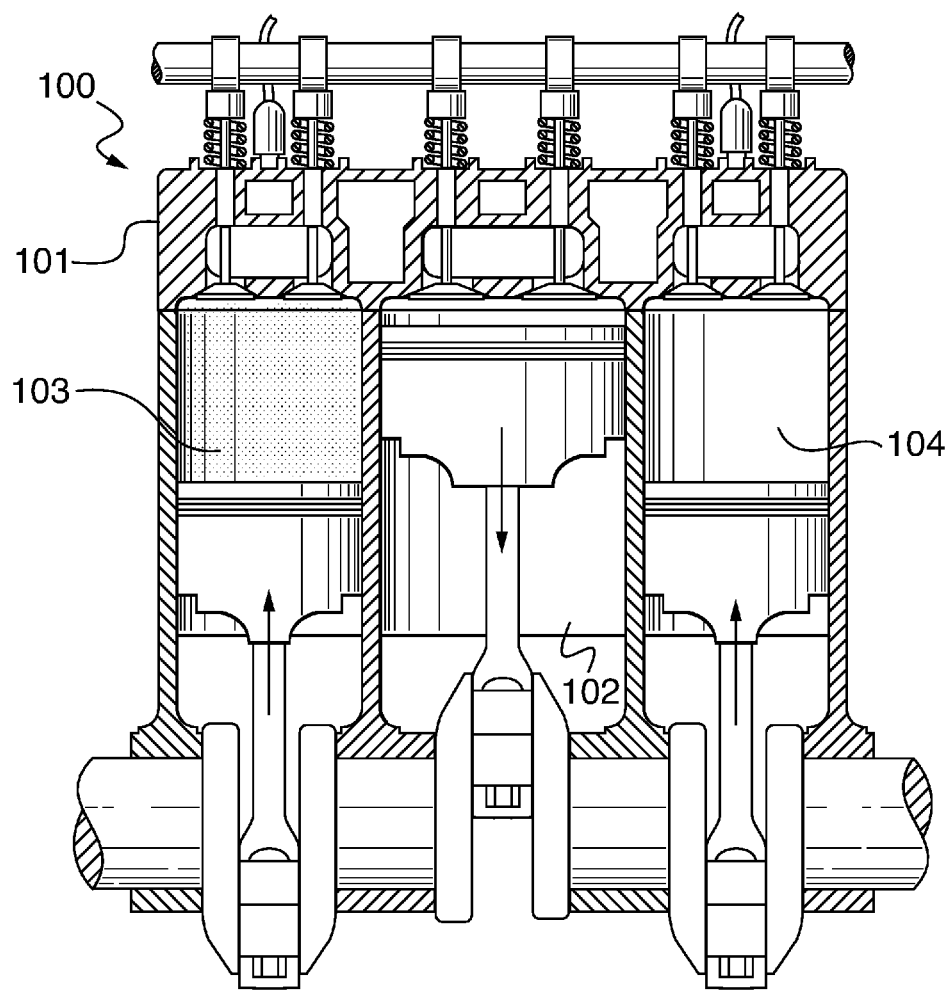
FIG. 9 is a cutaway side view at a first depth of a three-cylinder module comprising a four-stroke engine design wherein the left-hand combustion cylinder has just started its compression stroke, the right-hand combustion cylinder has just started its exhaust stroke and the compression cylinder has just started its intake stroke according to an embodiment.

FIG. 9 is a cutaway side view at a first depth 260 (shown in FIG. 2A) of a three-cylinder module 101 comprising a four-stroke engine design 100 wherein the left-hand combustion cylinder 103 just started its exhaust stroke and is near BDC, the right-hand combustion cylinder 104 has just started its compression stroke, and is just a split second after BDC, and the compression cylinder 102 has just started its intake stroke, and is just after top dead center (ATDC) according to an embodiment.

FIG. 10 is a cutaway side view at a first depth 260 (shown in FIG. 2A) of a three-cylinder module 101 comprising a four-stroke engine design 100 wherein the left-hand combustion cylinder 103 is in its compression stroke, the right-hand combustion cylinder 104 is in its exhaust stroke and the compression cylinder 102 is in its intake stroke according to an embodiment. FIG. 10 depicts the direction of movement of the combustion pistons, 113 and 114, and the compression piston 112 as well as the airflow and valve positioning, as each would appear moments after their relative positions as depicted in FIG. 9. Specifically, both the left-hand combustion cylinder piston 113 and right-hand combustion cylinder piston 114 are moving upward toward TDC and the compression cylinder piston 112 is moving downward toward BDC.

In FIG. 10, airflow, in the form of exhaust gasses, is depicted as curved arrows flowing from the right-hand combustion cylinder 104 into the cylinder head 106 and the right-hand combustion cylinder exhaust port 204. In an embodiment, this airflow can be created by the upward movement of the right-hand combustion piston 114, which pushes these exhaust gasses out of the right-hand combustion cylinder 104, through the right-hand exhaust valves 224, and into the right-hand combustion cylinder exhaust port 204 of the cylinder head 106.

Also in FIG. 10, airflow into the compression cylinder 102 is indicated by slightly longer curved arrows. Air can be drawn into the compression cylinder 102 by the downward motion of the compression piston 112, which can draw air into the three cylinder module 101 by pulling it through the intake port 202 through one or more compression cylinder intake valves 222 and into the compression cylinder 102.

No intake or exhaust airflow is occurring in the left-hand combustion cylinder 103 as its intake valves 243 and exhaust valves 223 are closed during the compression stroke as the fuel/air mixture, indicated by shading, is compressed prior to ignition.

FIG. 10A is a cutaway top view of three-cylinder module 101 comprising a four-stroke engine design 100, comprising a cylinder head 106 further comprising an intake air plenum 220, showing the valve positioning and airflow occurring in FIG. 10 according to an embodiment. In this view, exhaust flowing from the right-hand combustion cylinder exhaust port 204 and intake air into the intake port 202 is clearly shown. Additionally, this view shows the intake air plenum 220 comprising the cylinder head 106.

Figure 11:
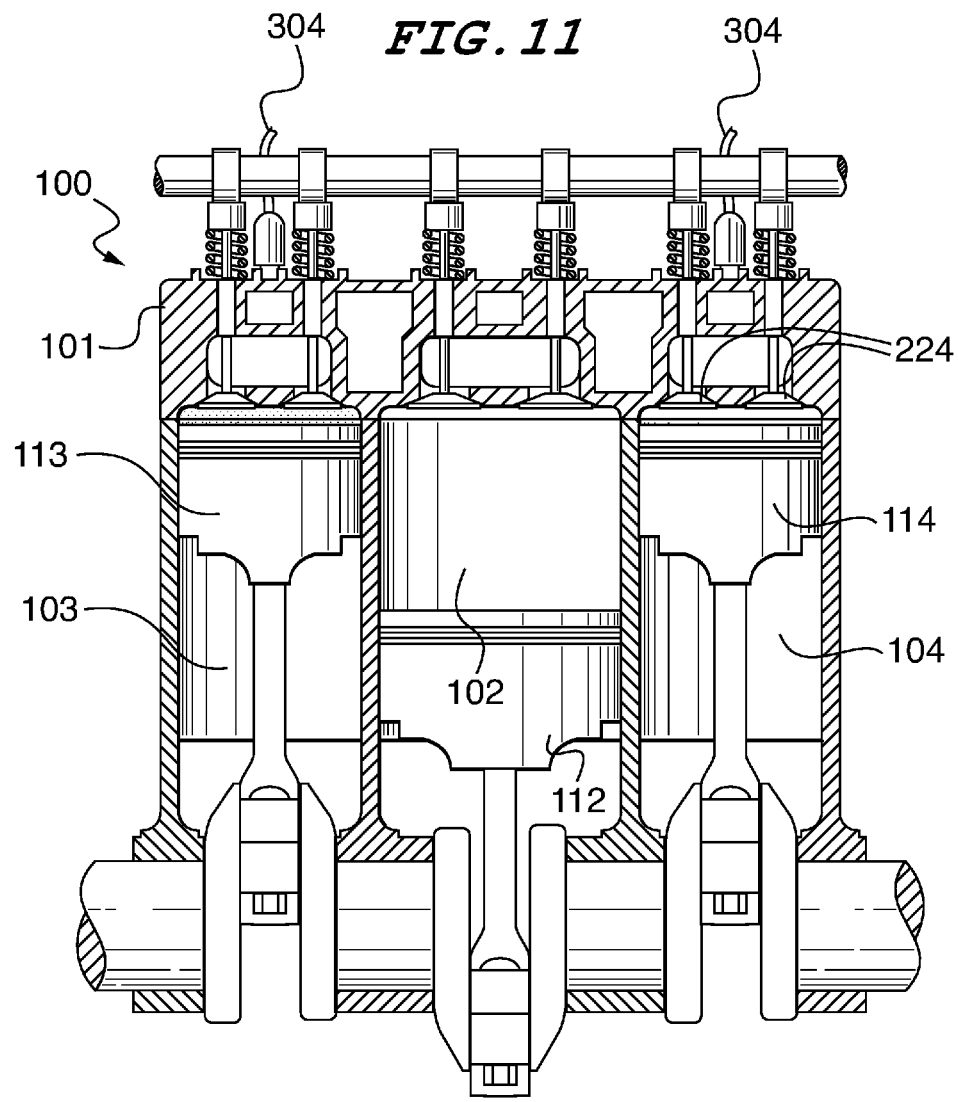
FIG. 11 is a cutaway side view at a first depth of a three-cylinder module comprising a four-stroke engine design wherein the left-hand combustion cylinder has completed its compression stroke, the right-hand combustion cylinder has completed its exhaust stroke and the compression cylinder has completed its intake stroke according to an embodiment.

FIG. 11 is a cutaway side view at a first depth 260 (shown in FIG. 2A) of three-cylinder module 101 comprising a four-stroke engine design 100 wherein the right-hand combustion cylinder 104 has completed its exhaust stroke, the left-hand combustion cylinder 103 has completed its compression stroke and the compression cylinder 102 has just completed its intake stroke according to an embodiment.

At this point in the engine's cycle, all of the valves comprising the three-cylinder module are closed. Both the right-hand combustion cylinder piston 114 and the left-hand combustion cylinder piston 113 are at TDC. The spent air and fuel mixture from the right-hand combustion cylinder 104 has been exhausted through the right-hand exhaust valves 224. In the left-hand combustion cylinder 103, the fuel/air mixture is at a maximum compression and at the point of ignition. As with any typical internal combustion engine, ignition can be provided by a spark plug 304, as shown in FIG. 11, or by any other suitable ignition source, or no ignition source in the case of diesel engines. This ignition marks the end of the compression stroke and the beginning of the power stroke for the left-hand combustion cylinder 103. The compression piston 112 is at BDC and the compression cylinder is filled with air that is at or near atmospheric pressure.

Figure 12A:
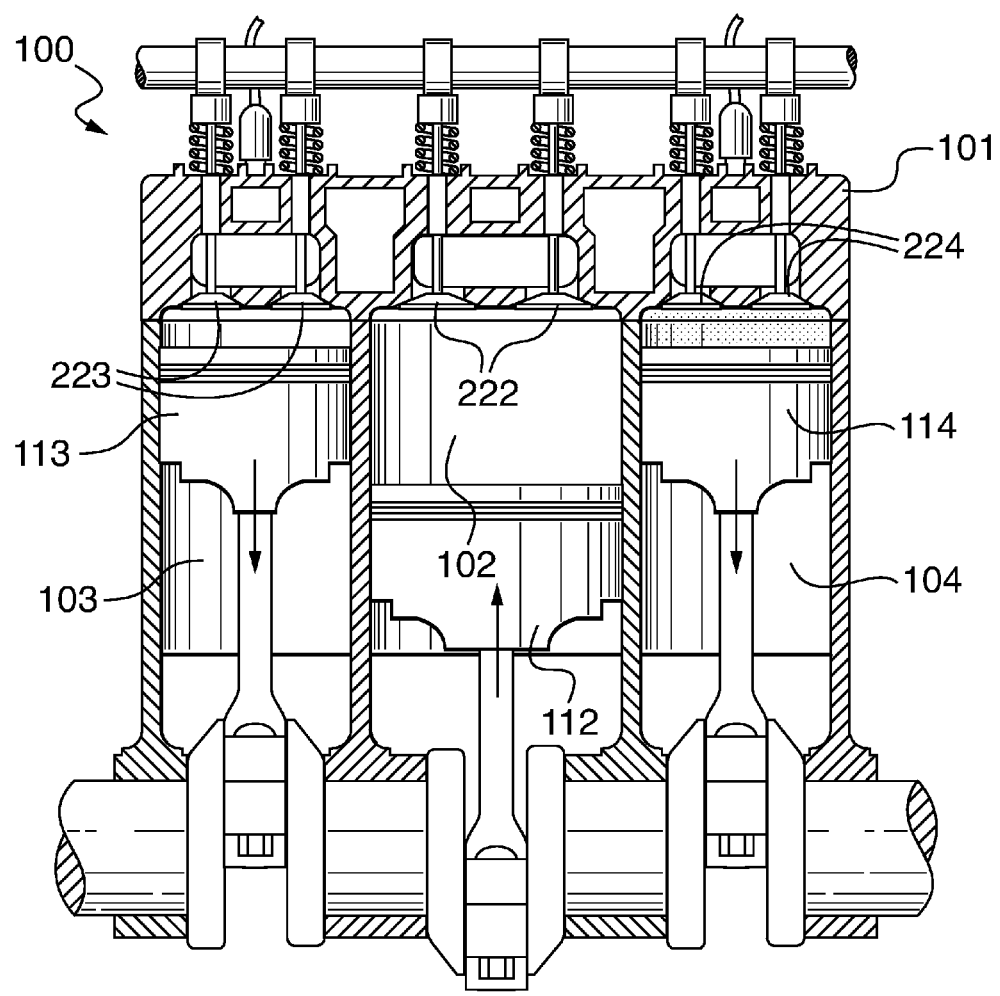
FIG. 12A is a cutaway side view at a first depth of a three-cylinder module comprising a four-stroke engine design wherein the left-hand combustion cylinder is beginning its power stroke after ignition by the spark plug, the right-hand combustion cylinder is beginning its intake stroke and the compression cylinder is beginning its compression stroke according to an embodiment.

FIG. 12A is a cutaway side view at a first depth 260 (shown in FIG. 2A) of the three-cylinder module 101 comprising a four-stroke engine design 100 wherein the right-hand combustion cylinder 104 is beginning its intake stroke, the left-hand combustion cylinder 103 is beginning its power stroke after ignition and the compression cylinder 102 is beginning its compression stroke according to an embodiment. FIG. 12A depicts the direction of movement of the combustion pistons, 113 and 114, and the compression piston 112 as each would appear moments after their relative positions as depicted in FIG. 11. Specifically, both the right-hand combustion cylinder piston 114 and left-hand combustion cylinder piston 113 are moving downward toward BDC and the compression cylinder piston 112 is moving upward toward TDC. At this point in the engine's cycle, the right-hand exhaust valves 224, the left-hand exhaust valves 223 and the compression cylinder intake valves 222 are all closed, according to an embodiment. The air/fuel mixture is depicted as shading in the right-hand combustion cylinder 104.

Figure 12B:
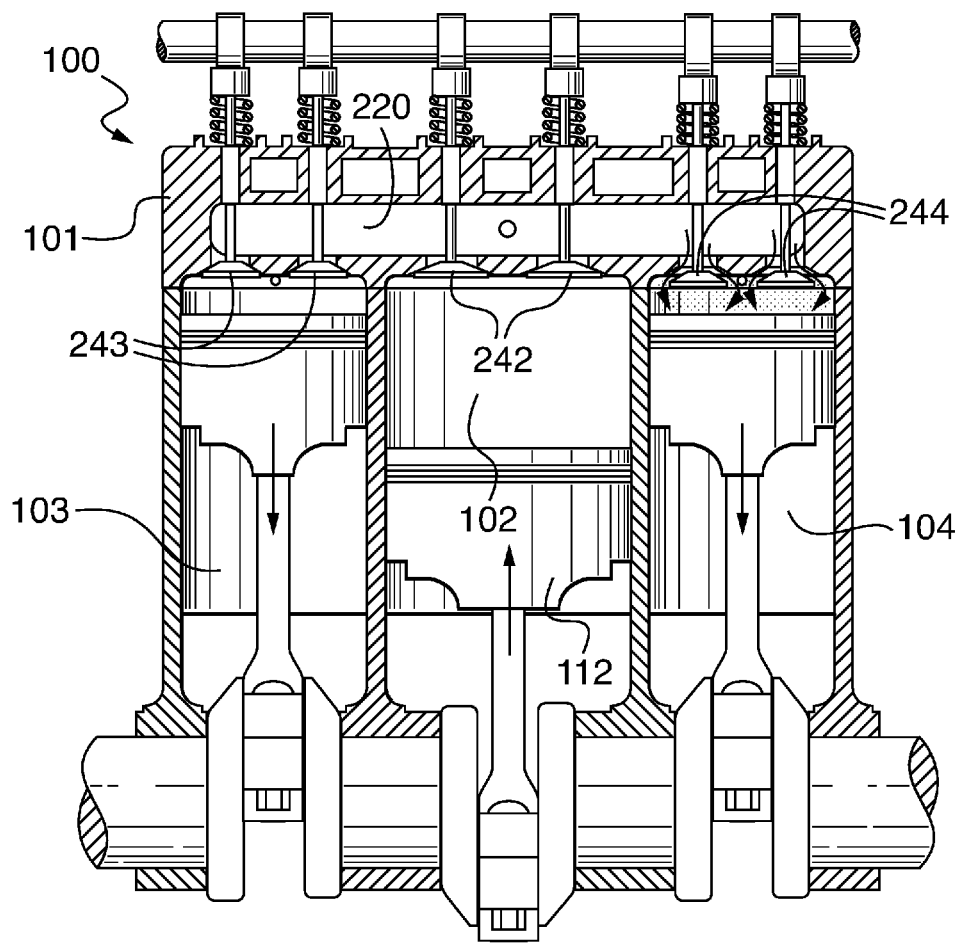
FIG. 12B is a cutaway side view at a second depth of a three-cylinder module comprising a four-stroke engine design, as shown in FIG. 12A, wherein the left-hand combustion cylinder is beginning its power stroke, after ignition by the spark plug, the right-hand combustion cylinder is beginning its intake stroke, showing the valve positioning and airflow, and the compression cylinder is beginning its compression stroke according to an embodiment.

FIG. 12B is a cutaway side view at a second depth 261 (shown in FIG. 2A) of the three-cylinder module 101 comprising a four-stroke engine design 100, as shown in FIG. 12A, wherein the right-hand combustion cylinder 104 is beginning its intake stroke, showing the valve positioning and airflow, the left-hand combustion cylinder 103 is beginning its power stroke after ignition and the compression cylinder 102 is beginning its compression stroke according to an embodiment. To be clear, FIG. 12B is showing the cutaway side at a second depth 261 while FIG. 4A is showing the cutaway side at a first depth 260 (as shown in FIG. 2A). This view shows the positions of the compression cylinder exhaust valves 242 and the left-hand intake valves 243 and right-hand intake valves 244. Airflow, depicted as short curved arrows, is shown flowing from the intake air plenum 220 past the right-hand intake valves 244 and into the right-hand combustion cylinder 104. In an embodiment, the air moving from the intake air plenum 220 into the right-hand combustion cylinder 104 could be pressurized to approximately 20 to 24 pounds per square inch.

In an embodiment, both the compression cylinder intake valve 222 (shown in FIG. 12A) and the compression cylinder exhaust valves 242 can remain closed while the compression cylinder piston 112 begins its upward movement from BDC to TDC. This allows some pressure to be created within the compression cylinder 102 before the compression cylinder exhaust valves 242 are opened and pressurized air is allowed to flow into the intake air plenum 220. The purpose of this valve delay is to prevent any back flow from the combustion cylinders, 103, and 104, into the compression cylinder 102.

Figure 13A:
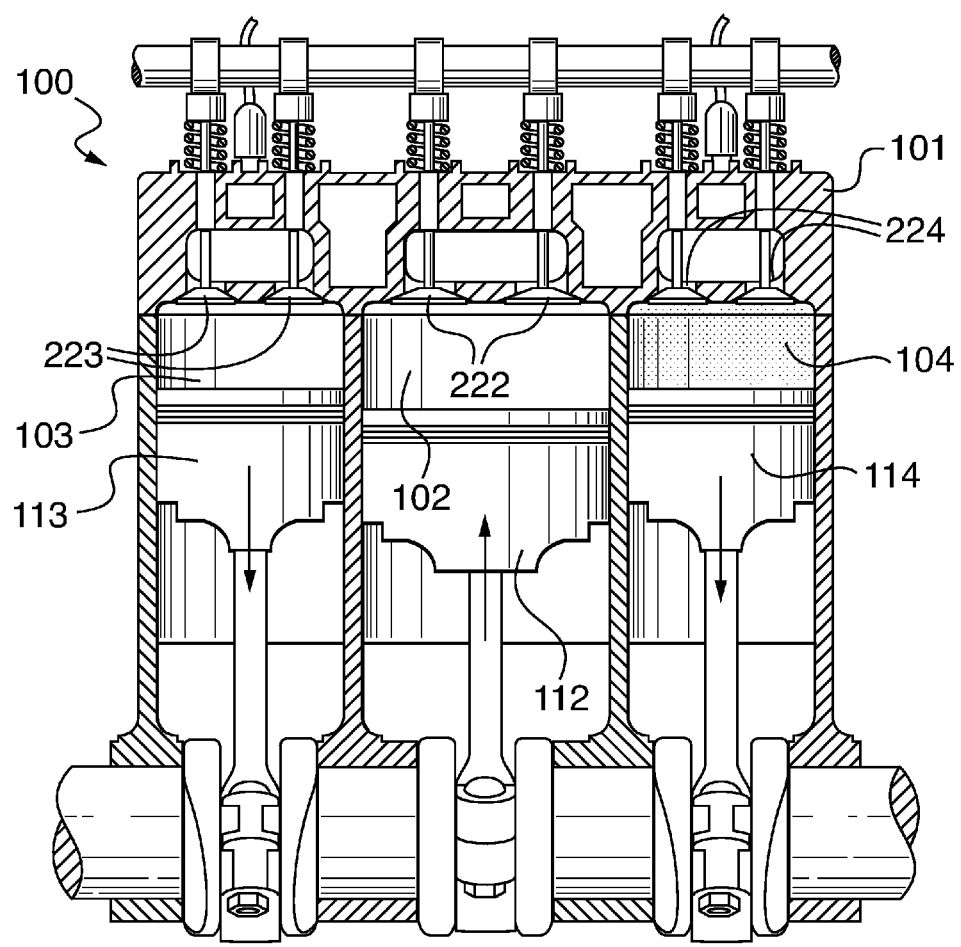
FIG. 13A is a cutaway side view at a first depth of a three-cylinder module comprising a four-stroke engine design, shown just a fraction of a second after the view depicted in FIG. 12A, wherein the left-hand combustion cylinder continues to be in its power stroke, the right-hand combustion cylinder continues to be in its intake stroke and the compression cylinder continues to be in its compression stroke according to an embodiment.

FIG. 13A is a cutaway side view at a first depth 260 (shown in FIG. 2A) of a three-cylinder module 101 comprising a four-stroke engine design 100, shown just a fraction of a second after the view depicted in FIG. 12A, wherein the right-hand combustion cylinder 104 is in its intake stroke, the left-hand combustion cylinder 103 is in its power stroke and the compression cylinder 102 is in its compression stroke according to an embodiment. Both the left-hand combustion cylinder piston 113 and the right-hand combustion cylinder piston 114 have moved into positions slightly closer to BDC than their respective positions in FIG. 12A. All of the combustion cylinder exhaust valves, 223 and 224, as well as the compression cylinder intake valves 222 remain closed at this point in the cycle.

FIG. 13B is a cutaway side view at a second depth 261 (shown in FIG. 2A) of a three-cylinder module 101 comprising a four-stroke engine design 100, as shown in FIG. 13A shown just a fraction of a second after the view depicted in FIG. 12A, wherein the right-hand combustion cylinder 104 is continuing its intake stroke, showing the valve positioning and airflow, the left-hand combustion cylinder 103 is continuing its power stroke and the compression cylinder 102 is continuing its compression stroke, showing the valve positioning and airflow, according to an embodiment. In this view, airflow is shown moving from the compression cylinder 102, into the intake air plenum 220 and into the right-hand combustion cylinder 104. This compressed air is added to the fuel injected into the right-hand combustion cylinder 104 when the right-hand combustion cylinder piston 114 is just after top dead center (ATDC) to create the desired fuel/air mixture within the right-hand combustion cylinder 104.

FIG. 13C is a cutaway top view of a three-cylinder module 101 comprising a four-stroke engine design 100, also comprising a cylinder head 106 further comprising an intake air plenum 220, showing the valve positioning and airflow occurring in FIGS. 13A and 13B according to an embodiment. All valves on the first side 550 of the cylinder head 106 can be closed at this point in the cycle. However, on the second side 551 (not shown in FIG. 13C) of the cylinder head 106, both the right-hand intake valves 244 and the compression cylinder exhaust valves 242 can be open to allow airflow from the compression cylinder 102 into the right-hand combustion cylinder 104. The left-hand intake valves 243 can be closed at this point in the cycle in this embodiment.

Figure 14A:
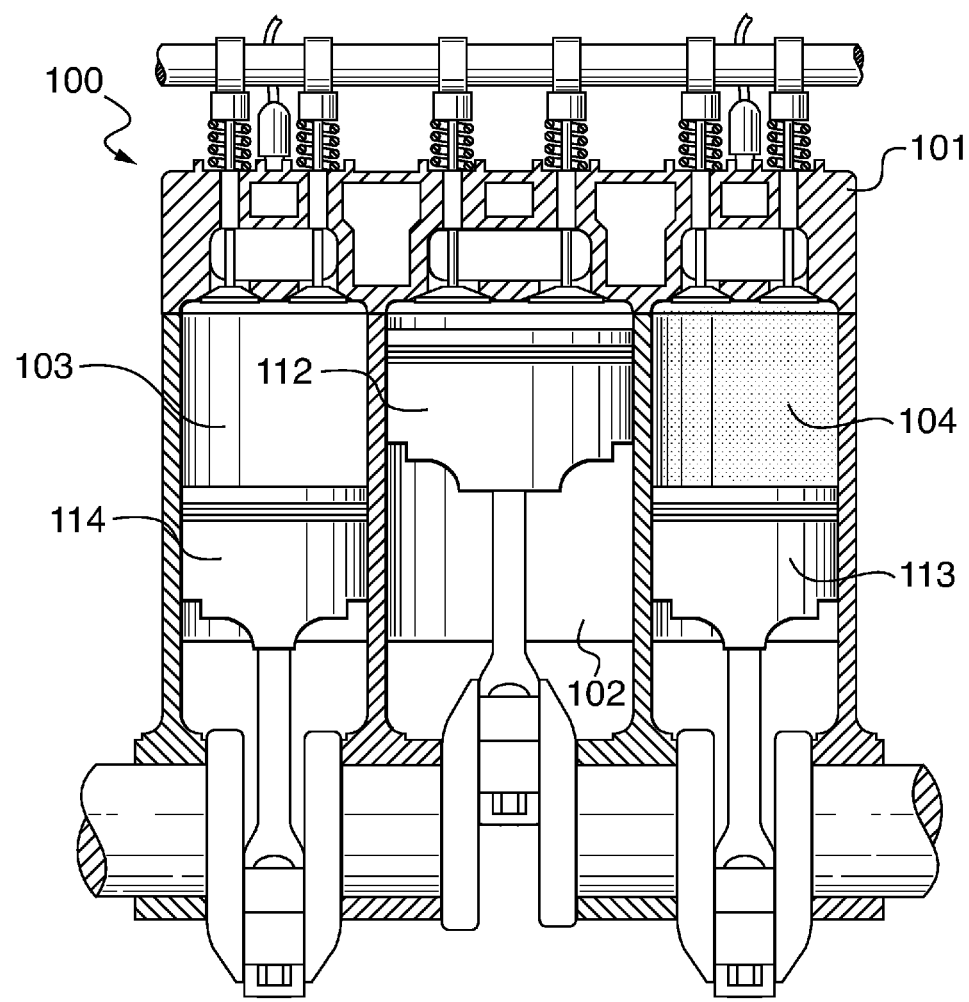
FIG. 14A is a cutaway side view at a first depth of a three-cylinder module comprising a four-stroke engine design, wherein the left-hand combustion cylinder has completed its power stroke, the right-hand combustion cylinder has completed its intake stroke and the compression cylinder has completed its compression stroke according to an embodiment.

FIG. 14A is a cutaway side view at a first depth 260 (shown in FIG. 2A) of the three-cylinder module 101 comprising a four-stroke engine design 100, wherein the right-hand combustion cylinder 104 has completed the intake stroke, the left-hand combustion cylinder 103 has completed the power stroke and the compression cylinder 102 has completed its compression stroke according to an embodiment. FIG. 14A shows the relative positions of the components comprising the three-cylinder module 101 just a fraction of a second after the view depicted in FIG. 13A. Specifically, both the left-hand combustion cylinder piston 113 and the right-hand combustion cylinder piston 114 are just after BDC (ABDC) and the compression cylinder piston 112 is just after TDC (ATDC). In the embodiment, as shown in the figures, the compression cylinder piston 112 and the two combustion cylinder pistons, 113 and 114 are one-hundred eighty (180) degrees out of phase. All valves comprising the three-cylinder module 101 can be closed at this stage of the cycle.

Figure 14B:
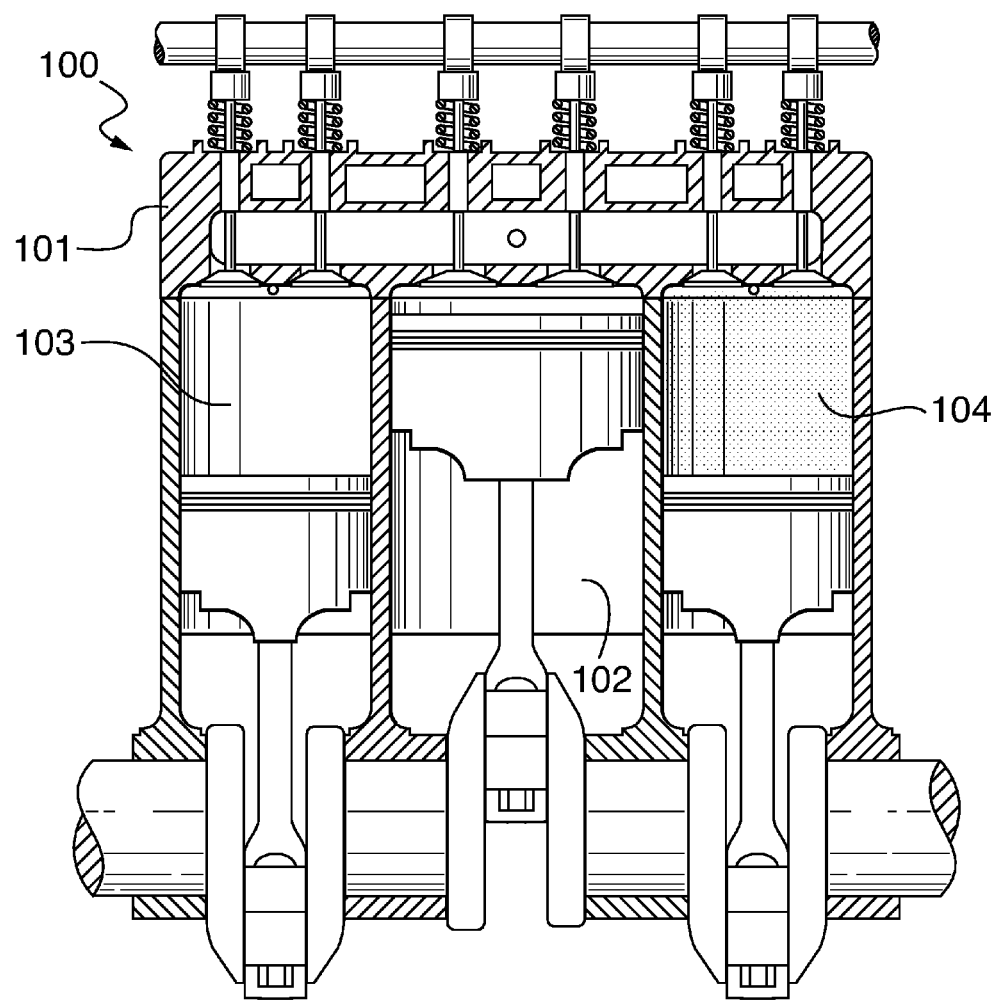
FIG. 14B is a cutaway side view at a second depth of a three-cylinder module comprising a four-stroke engine design, as shown in FIG. 14A, wherein the left-hand combustion cylinder has completed its power stroke, the right-hand combustion cylinder has completed its intake stroke and the compression cylinder has completed its compression stroke according to an embodiment.

FIG. 14B is a cutaway side view at a second depth 261 (shown in FIG. 2A) of a three-cylinder module 101 comprising a four-stroke engine design 100, as shown in FIG. 14A, wherein the right-hand combustion cylinder 104 has completed its intake stroke, the left-hand combustion cylinder 103 has completed its power stroke and the compression cylinder 102 has completed its compression stroke according to an embodiment. The pistons and cylinders are at the positions described in FIG. 14A. All valves on the second side of the three-cylinder module 101 can also be closed at this point in the engines cycle.

Figure 15A:
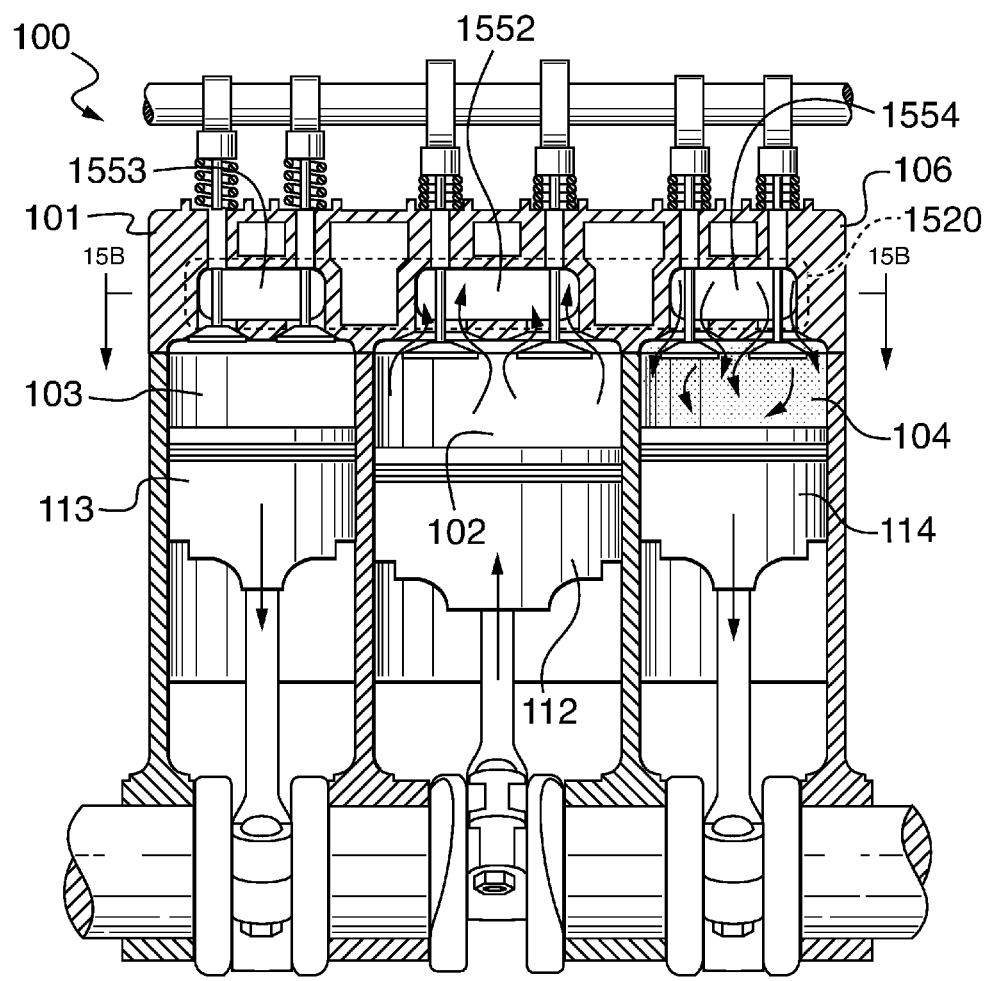
FIG. 15A is a cutaway side view at a second depth of an alternative three-cylinder module comprising a four-stroke engine design shown just a fraction of a second after the view depicted in FIG. 12A, wherein the left-hand combustion cylinder is continuing its power stroke, showing the valve positioning and the airflow, the right-hand combustion cylinder is continuing its intake stroke, and the compression cylinder is continuing its compression stroke, showing the valve positioning and airflow, according to an alternative embodiment.

FIG. 15A is a cutaway side view at a second depth 261 (shown in FIG. 2A) of a three-cylinder module 101 comprising a four-stroke engine design 100 shown just a fraction of a second after the view depicted in FIG. 12A, wherein the left-hand combustion cylinder 103 is continuing its power stroke, showing the valve positioning and the airflow, the right-hand combustion cylinder 104 is continuing its intake stroke, and the compression cylinder 102 is continuing its compression stroke, showing the valve positioning and airflow, according to an alternative embodiment. In an alternative embodiment, the left-hand combustion cylinder intake port 1553 and the right-hand combustion cylinder intake port 1554 can allow air to flow from the compression cylinder 102 to each of the two combustion cylinders 103 and 104 through an external intake air plenum 1520.

FIG. 15B is a cutaway top view of a three-cylinder module 101 comprising a four-stroke engine design 100, also comprising an external plenum 1520, showing the valve positioning and airflow occurring in FIG. 15A according to an alternative embodiment. In this alternative embodiment, the left-hand combustion cylinder intake port 1553 and the right-hand combustion cylinder intake port 1554 can allow air to flow from the compression cylinder 102 to each of the two combustion cylinders 103 and 104 through an external intake air plenum 1520.

Although the present engine design has been described in terms of exemplary embodiments, it is not limited thereto. Rather, the appended claims should be construed broadly, to include other variants and embodiments of the device, which may be made by those skilled in the art without departing from the scope and range of equivalents of the present inventive concept.

What is claimed is:

1. An engine design comprising:
   an engine block;
   a crankshaft;
   at least one three-cylinder module, the three-cylinder module comprising: a left-hand combustion cylinder located within the engine block and a left-hand combustion cylinder piston located within the left-hand combustion cylinder and connected to the crankshaft; a right-hand combustion cylinder located within the engine block and a right-hand combustion cylinder piston located within the right-hand combustion cylinder and connected to the crankshaft;
   a compression cylinder located within the engine block and a compression cylinder piston located within the compression cylinder and connected to the crankshaft; wherein the right-hand combustion cylinder and the left-hand combustion cylinder are configured to perform an intake stroke, a compression stroke, a power stroke and an exhaust stroke and the compression cylinder is configured to perform only an intake stroke and a compression stroke; and
   a cylinder head connected to the engine block, comprising at least one left-hand cylinder intake valve and at least one left-hand cylinder exhaust valve, at least one right-hand cylinder intake valve and at least one right-hand cylinder exhaust valve, and at least one compression cylinder intake valve and at least one compression cylinder exhaust valve, the cylinder head also comprising an intake air plenum connecting the at least one compression cylinder exhaust valve to at least one left-hand cylinder intake valve and the intake air plenum connecting the at least one compression cylinder exhaust valve to at least one right-hand cylinder intake valve;
   wherein the compression cylinder intake valve and the compression cylinder exhaust valve are configured to remain closed while the compression piston begins upward movement which creates a positive pressure within the compression cylinder before the compression cylinder exhaust valve is opened.

2. An engine design as recited in claim 1 wherein the compression cylinder is located between the left-hand combustion cylinder and the right-hand combustion cylinder within the engine block.

3. An engine design as recited in claim 1 wherein at least one left-hand cylinder exhaust valve, at least one right-hand cylinder exhaust valve, and at least one compression cylinder intake valve are configured to be actuated by a first side camshaft comprising at least one cam for each actuated valve, wherein the cams used to actuate the compression cylinder intake valves are dual-lobed cams in which the cam lobes are 180 degrees out of phase.

4. An engine design as recited in claim 1 wherein at least one left-hand cylinder intake valve, at least one right-hand cylinder intake valve, and at least one compression cylinder exhaust valve are configured to be actuated by a second side camshaft comprising at least one cam for each actuated valve, wherein the cams used to actuate the compression cylinder exhaust valves are dual-lobed cams wherein each lobe is 180 degrees out of phase.

5. An engine design as recited in claim 1 wherein the compression cylinder piston is 180 degrees out of phase with both the left-hand combustion cylinder piston and the right-hand combustion cylinder piston.

6. An engine design as recited in claim 1 wherein the compression cylinder is configured to provide intake air to both the left-hand combustion cylinder and the right-hand combustion cylinder through the intake air plenum, which is cast into the cylinder head.

7. An engine design as recited in claim 1 wherein the plenum comprises a plenum pressure release valve.

8. An engine design as recited in claim 1 wherein the intake air plenum is an external intake air plenum.

9. An engine design as recited in claim 8 wherein the external intake air plenum comprises a plenum pressure release valve.

10. An engine design as recited in claim 1 wherein the engine is configured to run on diesel fuel.

11. An engine design as recited in claim 1 wherein the engine is configured to run on gasoline.

12. An engine design comprising:
an engine block;
a crankshaft;
at least one three-cylinder module, the three-cylinder module comprising: a left-hand combustion cylinder located within the engine block and a left-hand combustion cylinder piston located within the left-hand combustion cylinder and connected to the crankshaft; a right-hand combustion cylinder located within the engine block and a right-hand combustion cylinder piston located within the right-hand combustion cylinder and connected to the crankshaft;
a compression cylinder located within the engine block and a compression cylinder piston located within the compression cylinder and connected to the crankshaft; wherein the right-hand combustion cylinder and the left-hand combustion cylinder are configured to perform an intake stroke, a compression stroke, a power stroke and an exhaust stroke and the compression cylinder is configured to perform only an intake stroke and a compression stroke; and
a cylinder head connected to the engine block, comprising at least one left-hand cylinder intake valve and at least one left-hand cylinder exhaust valve, at least one right-hand cylinder intake valve and at least one right-hand cylinder exhaust valve, and at least one compression cylinder intake valve and at least one compression cylinder exhaust valve, the cylinder head also comprising an intake air plenum connecting the at least one compression cylinder exhaust valve to at least one left-hand cylinder intake valve and the intake air plenum connecting the at least one compression cylinder exhaust valve to at least one right-hand cylinder intake valve;
wherein at least one left-hand cylinder exhaust valve, at least one right-hand cylinder exhaust valve, and at least one compression cylinder intake valve are configured to be actuated by a first side camshaft comprising at least one cam for each actuated valve, wherein the cams used to actuate the compression cylinder intake valves are dual-lobed cams in which the cam lobes are 180 degrees out of phase;
wherein at least one left-hand cylinder intake valve, at least one right-hand cylinder intake valve, and at least one compression cylinder exhaust valve are configured to be actuated by a second side camshaft comprising at least one cam for each actuated valve, wherein the cams used to actuate the compression cylinder exhaust valves are dual-lobed cams wherein each lobe is 180 degrees out of phase;
wherein the left-hand combustion cylinder is configured to perform an intake stroke, compression stroke, power stroke, or exhaust stroke;
wherein the right-hand combustion cylinder is configured to perform an intake stroke, compression stroke, power stroke, or exhaust stroke;
wherein the compression cylinder is configured to perform an intake stroke or a compression stroke, and;
wherein the compression cylinder intake valve and the compression cylinder exhaust valve are configured to remain closed while the compression piston begins upward movement which creates a positive pressure to be created within the compression cylinder before the compression cylinder exhaust valve is opened.

13. The engine as described in claim 12 wherein the engine is further configured such that the left-hand combustion cylinder is in an intake stroke when the right-hand combustion cylinder is in a power stroke and the compression cylinder is in a compression stroke.

14. The engine as described in claim 12 wherein the engine is further configured such that the left-hand combustion cylinder is in a compression stroke when the right-hand combustion cylinder is in an exhaust stroke and the compression cylinder is in an intake stroke.

15. The engine as described in claim 12 wherein the engine is further configured such that the left-hand combustion cylinder is in a power stroke when the right-hand combustion cylinder is in an intake stroke and the compression cylinder is in a compression stroke.

16. The engine as described in claim 12 wherein the engine is further configured such that the left-hand combustion cylinder is in an exhaust stroke when the right-hand combustion cylinder is in a compression stroke and the compression cylinder is in an intake stroke.

* * * * *